US008711265B2

(12) United States Patent
Kawamura et al.

(10) Patent No.: US 8,711,265 B2
(45) Date of Patent: Apr. 29, 2014

(54) IMAGE PROCESSING APPARATUS, CONTROL METHOD FOR THE SAME, AND STORAGE MEDIUM

(75) Inventors: Kohei Kawamura, Kawasaki (JP); Toshiyuki Noguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 382 days.

(21) Appl. No.: 12/429,505

(22) Filed: Apr. 24, 2009

(65) Prior Publication Data
US 2009/0268076 A1 Oct. 29, 2009

(30) Foreign Application Priority Data

| Apr. 24, 2008 | (JP) | 2008-113898 |
| Apr. 24, 2008 | (JP) | 2008-113899 |
| May 19, 2008 | (JP) | 2008-130760 |
| May 19, 2008 | (JP) | 2008-130761 |

(51) Int. Cl.
*H04N 5/222* (2006.01)
*H04N 5/262* (2006.01)

(52) U.S. Cl.
USPC ............... 348/333.02; 348/333.12; 348/240.2

(58) Field of Classification Search
USPC ............... 348/240.2, 333.2, 333.11, 333.12, 348/222.1; 382/118
See application file for complete search history.

(56) References Cited

U.S. PATENT DOCUMENTS

| 7,298,409 | B1 * | 11/2007 | Misawa | 348/333.01 |
| 7,492,406 | B2 * | 2/2009 | Park et al. | 348/333.05 |
| 7,796,178 | B2 * | 9/2010 | Hasegawa | 348/333.01 |
| 7,952,618 | B2 * | 5/2011 | Kawada | 382/118 |
| 2002/0055955 | A1 * | 5/2002 | Lloyd-Jones et al. | 707/512 |
| 2003/0071904 | A1 * | 4/2003 | Karasaki et al. | 348/240.2 |
| 2007/0242143 | A1 * | 10/2007 | Sugimoto | 348/240.2 |
| 2009/0006484 | A1 * | 1/2009 | Wang | 707/200 |

FOREIGN PATENT DOCUMENTS

| JP | 2001-197289 A | 7/2001 |
| JP | 2002-358522 A | 12/2002 |
| JP | 2003-141512 A | 5/2003 |
| JP | 2004-046591 A | 2/2004 |
| JP | 2004-246454 A | 9/2004 |
| JP | 2005-020446 A | 1/2005 |
| JP | 2006-072506 A | 3/2006 |
| JP | 2006-163496 A | 6/2006 |
| JP | 2006-254229 A | 9/2006 |

(Continued)

OTHER PUBLICATIONS

DiMAGE Messenger Version 1.00, Jul. 1, 2003, ASCLL. PC vol. 6, No. 7, p. 187.
DiMAGE Messenger, May 1, 2003, DOS/V magazine vol. 12, No. 9, p. 155.
DiMAGE Messenger Version 1.00, Jul. 1, 2003, ASCII. PC vol. 6, No. 7, p. 187, the article is introducing the same product as described in reference 2.
DiMAGE Messenger, May 1, 2003, DOS/V magazine vol. 12, No. 9, p. 155, partial translation attached.

*Primary Examiner* — Nhan T Tran
(74) *Attorney, Agent, or Firm* — Canon U.S.A., Inc., IP Division

(57) ABSTRACT

An image taking apparatus is configured to obtain image data by taking an image of an object, recording the image data on a recording medium, and reproducing the image data recorded on the recording medium to display the image. The image taking apparatus includes a scale-up display unit configured to display a partial area of the image in an enlarged scale, a setting unit configured to selectively set a flag indicating a rating for the partial area displayed in the enlarged scale, and a storing unit configured to store, on the recording medium, the flag set for the partial area and position information representing a position of the partial area in relation to the image data.

25 Claims, 34 Drawing Sheets

(56) References Cited

FOREIGN PATENT DOCUMENTS

| JP | 2006-261711 A | 9/2006 |
| JP | 2007-019893 A | 1/2007 |
| JP | 2007-036603 A | 2/2007 |
| JP | 2007-052646 A | 3/2007 |
| JP | 2007-150955 A | 6/2007 |
| JP | 2007-208732 A | 8/2007 |
| JP | 2007-243733 A | 9/2007 |
| JP | 2008-027401 A | 2/2008 |
| JP | 2008-052402 A | 3/2008 |
| JP | 2008-092299 A | 4/2008 |
| JP | 2009-278599 A | 11/2009 |

\* cited by examiner

FIG. 12

| AREA ID | AREA POSITION | MARK TYPE |
|---|---|---|
| Area_1 | (200, 400)–(800, 900) | OK |
| Area_2 | (800, 500)–(1400, 1000) | OK |
| Area_3 | (1200, 400)–(1800, 700) | OK |
| Area_4 | (1600, 1200)–(2000, 1600) | NO |

FIG. 16

| AREA ID | AREA POSITION | MARK TYPE | MARK LEVEL |
|---|---|---|---|
| Area_1 | (200, 400)−(800, 900) | OK | 3 |
| Area_2 | (800, 500)−(1400, 1000) | OK | 1 |
| Area_3 | (1200, 400)−(1800, 700) | OK | 5 |
| Area_4 | (1600, 1200)−(2000, 1600) | NO | |

FIG. 26

| MARK TYPE (2601) | MARK LEVEL (2602) | OK COEFFICIENT (2603) | NO COEFFICIENT (2604) |
|---|---|---|---|
| OK | 1 | 1.1 | |
| OK | 2 | 1.2 | |
| OK | 3 | 1.3 | |
| OK | 4 | 1.4 | |
| OK | 5 | 1.5 | |
| NO | | | 1 |

| IMAGE ID (2701) | AREA ID (2702) | SIZE RATE (2703) | MARK TYPE (2704) | PARTIAL OK SCORE (2705) | PARTIAL NO SCORE (2706) |
|---|---|---|---|---|---|
| img0201 | Area_1 | 20 | OK | 26 | 0 |
| img0201 | Area_2 | 15 | OK | 16.5 | 0 |
| img0201 | Area_3 | 15 | OK | 22.5 | 0 |
| img0201 | Area_4 | 15 | NO | 0 | 15 |

FIG. 28

| IMAGE ID | OK SCORE | NO SCORE |
|---|---|---|
| img0201 | 65 | 15 |
| img0210 | 48 | 0 |
| img0220 | 0 | 10 |
| img0230 | 0 | 0 |

IN CASE OF Q/P ≥ S/R

IN CASE OF Q/P < S/R

IMAGE PROCESSING APPARATUS, CONTROL METHOD FOR THE SAME, AND STORAGE MEDIUM

BACKGROUND OF THE INVENTION

1. Field of the Invention

The present invention relates to an image processing apparatus configured to store and reproduce an image, a control method for the image processing apparatus, and a storage medium storing computer-executable instructions.

2. Description of the Related Art

Hitherto, it has been general practiced to print an image taken (e.g., photographed) by a digital camera and to distribute printed photos to a plurality of persons. On such occasions, a user designates printing by manipulating the digital camera such that the image to be printed, and the number of prints, is recorded in a recording medium in conformity with a specific standard, e.g., DPOF (Digital Print Order Format). More specifically, the user reproduces the image taken by the digital camera, displays a primary partial area as a target of the photographing, e.g., a primary structure or a face of a primary person in a photographed scene, in an enlarged scale, and determines whether the photographing (i.e., image-taking) has succeeded or failed. Depending on the determination result, for example, the user may designate, as a printing target, the image for which the success of the photographing has been determined, and the user may not designate, as a printing target, the image for which the failure of the photographing has been determined.

When a plurality of persons are photographed in one image, it often happens that the photographing of one person has succeeded and the photographing of the other persons has failed. In such a case, however, the user may only be able to determine the condition of the taken image for each person and to set, for the entire image, whether the relevant image is designated as the printing target. Regarding the reasons used in the determination, the user may only be able to keep in mind, for example, the fact that an area in which the photographing has succeeded and an area in which the photographing has failed are both present in the relevant image, and the condition of the image for each target in the relevant image. If there are many images, it can be very difficult for the user to precisely keep those reasons in mind. Accordingly, when the user reproduces the same image later, the user may have to make another determination in detail with respect to the condition of the image for each target in a similar manner by displaying the image again in an enlarged scale.

SUMMARY OF THE INVENTION

According to an exemplary embodiment of the present invention, an image taking apparatus is provided that is configured to obtain image data by taking an image of an object, recording the image data on a recording medium, and reproducing the image data recorded on the recording medium to display the image. The image taking apparatus includes a scale-up display unit configured to display a partial area of the image in an enlarged scale. The image taking apparatus also includes a setting unit configured to selectively set a flag indicating a rating for the partial area displayed in the enlarged scale, and a storing unit configured to store, on the recording medium, the flag set for the partial area and position information representing a position of the partial area in relation to the image data.

According to yet another exemplary embodiment of the invention, an image processing apparatus is provided that is configured to reproduce image data to display an image on a display. The image processing apparatus includes a designation unit configured to designate a partial area of the image, a setting unit configured to selectively set a flag indicating a rating for the designated partial area, and a storage unit configured to store, in relation to the image data, the flag set for the partial area and position information representing a position of the partial area.

Further features of the present invention will become apparent from the following description of exemplary embodiments with reference to the attached drawings.

BRIEF DESCRIPTION OF THE DRAWINGS

FIG. 12 illustrates one example of a mark information data table in the first exemplary embodiment and the second exemplary embodiment of the present invention.

FIG. 16 illustrates another example of the mark information data table in the first exemplary embodiment of the present invention.

FIG. 26 illustrates an example of an OK/NG coefficient table in the third exemplary embodiment of the present invention.

FIG. 27 illustrates an example of a partial-area OK/NG management table in the third exemplary embodiment of the present invention.

FIG. 28 illustrates an example of an image OK/NG score management table in the third exemplary embodiment of the present invention.

DESCRIPTION OF THE EMBODIMENTS

Embodiments for carrying out the present invention will be described in detail below with reference to the accompanying drawings. Specifically, exemplary embodiments of an image processing method, an image processing apparatus, and a storage medium storing an image processing program and/or computer-executable instructions will be first described in connection with a digital camera, for example.

Figure 1:
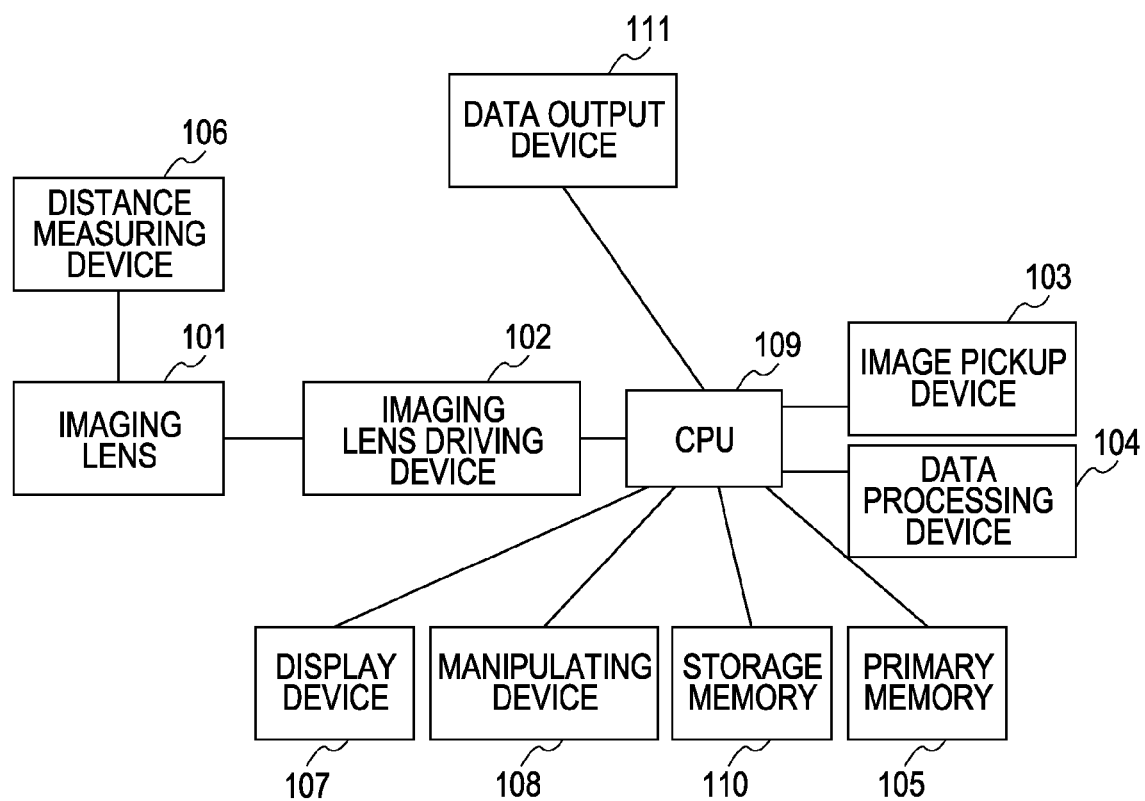
FIG. 1 is a block diagram illustrating an example of the overall configuration of a digital camera according to a first exemplary embodiment of the present invention.

FIG. 1 is a block diagram illustrating an example of the circuit configuration of a digital camera 100 according to a first exemplary embodiment of the present invention. Referring to FIG. 1, the digital camera 100 includes an imaging (e.g., photographing) lens 101 and an imaging lens drive device 102 for changing a zooming position of the imaging lens 101 to perform a focus adjustment. An image pickup device 103 generates electronic image data through photoelectric conversion of an object image formed by the imaging lens 101. A data processing device 104 executes image processing that includes, for example, predetermined processing of an image signal, which is obtained from the image pickup device 103, to generate image data, and conversion of the image data to display, edit and store the image data. A primary memory 105 temporarily stores the image data. A distance measuring device 106 measures the distance from the camera to an object in a photographing area of the imaging lens 101. A display device 107 displays information such as the image data, and a manipulating device 108 is used to perform various settings of the digital camera 100. A central processing unit (CPU) 109 executes control for various operations of the digital camera 100. A storage memory 110 stores the image data, information associated with the image data, etc. The storage memory 110 includes media attached to the digital camera 100 in a detachable manner. A data output device 111 outputs, to an external apparatus, the image data recorded in a storage device of the digital camera 100. The external apparatus may be, for example, an external storage for recording the image data on media, such as at least one of a CD and a DVD, or a printer for printing an image.

Figure 2:
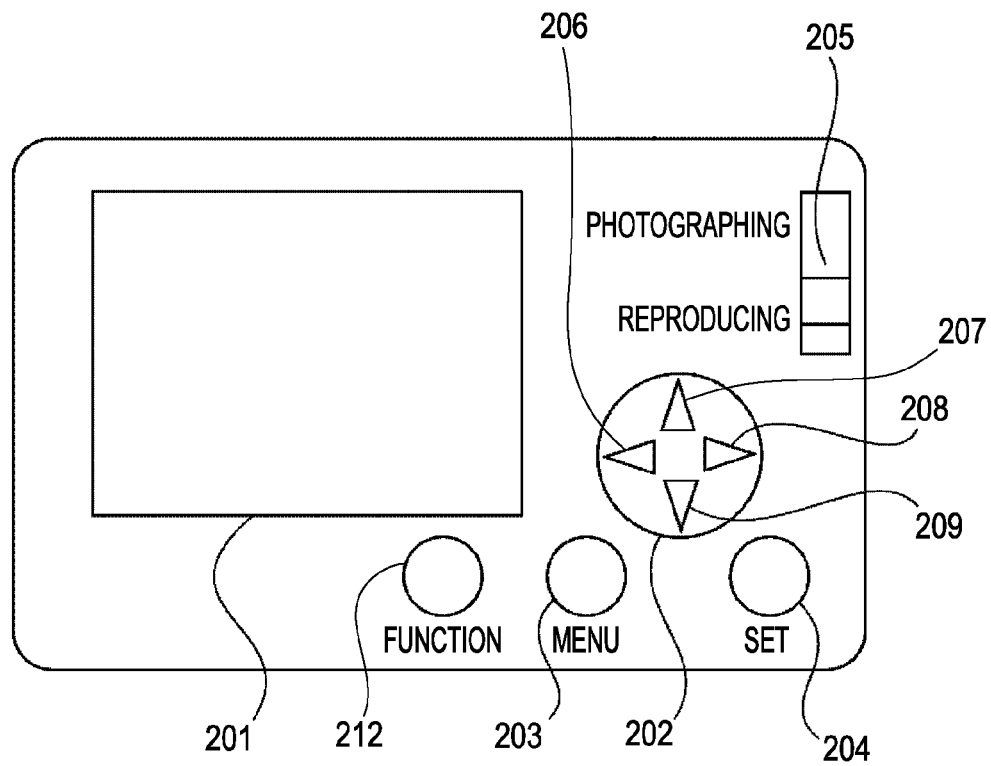
FIG. 2 illustrates an example of component layout on a rear surface of the digital camera according to the first exemplary embodiment of the present invention.

FIG. 2 is an example of a rear view of the digital camera 100 according to the first exemplary embodiment. Referring to FIG. 2, a display screen 201 is included in the display device 107 and comprises a LCD panel, for example. A cross-arrow key 202 is disposed to move a cursor or the like displayed on the display screen 201 upwards, downwards, rightwards or leftwards, and to move a position of a displayed image area upwards, downwards, rightwards or leftwards for designating the position. Reference numerals 206, 207, 208 and 209 denote respectively buttons for instructing movements to the upward, downward, rightward and leftward sides. While this exemplary embodiment is illustrated as arranging the individual buttons to designate upward, downward, rightward and leftward positions, respectively, the cross-arrow key 202 may also and/or alternatively be a pointing device or a multi-controller which is in the form of a single button and which is able to designate a position in any direction including upward, downward, rightward or leftward directions, as well as oblique directions. A menu button 203 is disposed to instruct whether a menu screen is to be displayed or not on the display screen 201. A set button 204 is disposed to definitively confirm a selected item upon an action of manipulation, for example, when one item in a menu or functions displayed on the display screen 201 is selected. A function button 212 is disposed to designate the function in a manner combined with one or more other manipulating buttons. Further, a mode selection switch 205 is disposed to change over the operation of the digital camera 100. More specifically, the mode selection switch 205 is used to select at least one of a photographing mode for photographing an image and a reproducing mode for reproducing and displaying an image.

Figure 3:
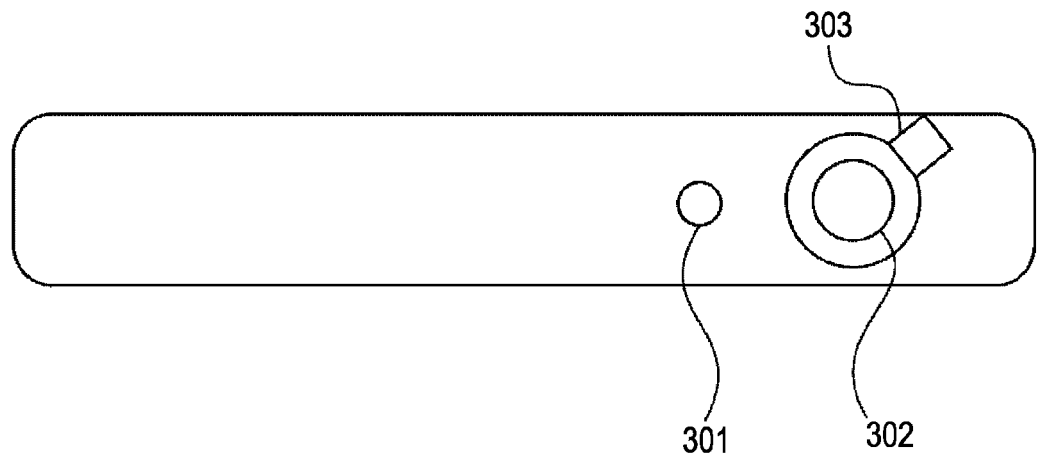
FIG. 3 illustrates an example of component layout on an upper surface of the digital camera according to the first exemplary embodiment of the present invention.

FIG. 3 is an example of a plan view of the digital camera 100 according to the first exemplary embodiment. Referring to FIG. 3, the digital camera 100 includes a power switch 301 and a shutter button 302 for taking an image. Further, the digital camera 100 includes a multifunction lever 303 (also called a zooming lever) of which function can be changed over depending on the position of the mode selection switch 205 in FIG. 2. When the mode selection switch 205 is in the photographing mode, the multifunction lever 303 may be used to input an instruction for adjustment of enlargement (e.g., scale-up) or reduction (e.g., scale-down) of an object to be photographed. When the mode selection switch 205 is in the reproducing mode, the mode selection switch 205 may be used to input not only an instruction for adjustment of enlargement or reduction of an object to be displayed, but also an instruction for changing over display of plural images and display of one image. While this exemplary embodiment is described as realizing the display adjustment for enlargement or reduction of a displayed image with one multifunction lever 303, a display adjustment mechanism is not limited to such an arrangement. For example, a reduction button and an enlargement button can also be separately disposed. The cross-arrow key 202, the menu button 203, the set button 204, the mode selection switch 205, the function button 212, the power button 301, the shutter button 302, and the multifunction lever 303 are included in the manipulating device 108 illustrated in the embodiment shown in FIG. 1.

Figure 4:
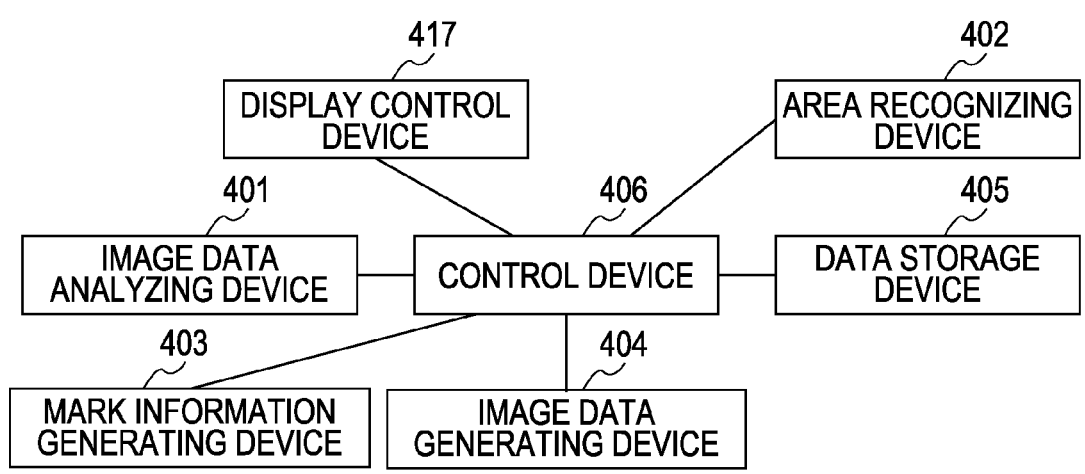
FIG. 4 is a block diagram illustrating an example of the configuration of a data processing device in the first exemplary embodiment of the present invention.

FIG. 4 is a block diagram illustrating an example of the configuration of the data processing device 104 in the first exemplary embodiment. Referring to FIG. 4, an image data analyzing device 401 analyzes the image data and obtains mark information data. An area recognizing device 402 recognizes a partial area of an image, which may be designated by, for example, at least one of an enlargement manipulation and automatic recognition, and specifies a position of the designated partial area. A mark information generating device 403 generates, as data, the mark information designated by the manipulation made on the manipulating device 108. An image data generating device 404 generates a mark information data file to store the substance of the image data, such as JPEG data, in correspondence to the mark information. A data storage device 405 stores the generated mark information data file in the storage memory 110 in relation to an image file. A control device 406 controls the various processing devices of the data processing device 104. The control device 406 is included in the CPU 109.

The following description is made of an example of an operation for designating a partial area included in an image and setting rating information by employing the digital camera 100 according to this exemplary embodiment.

Figure 5:
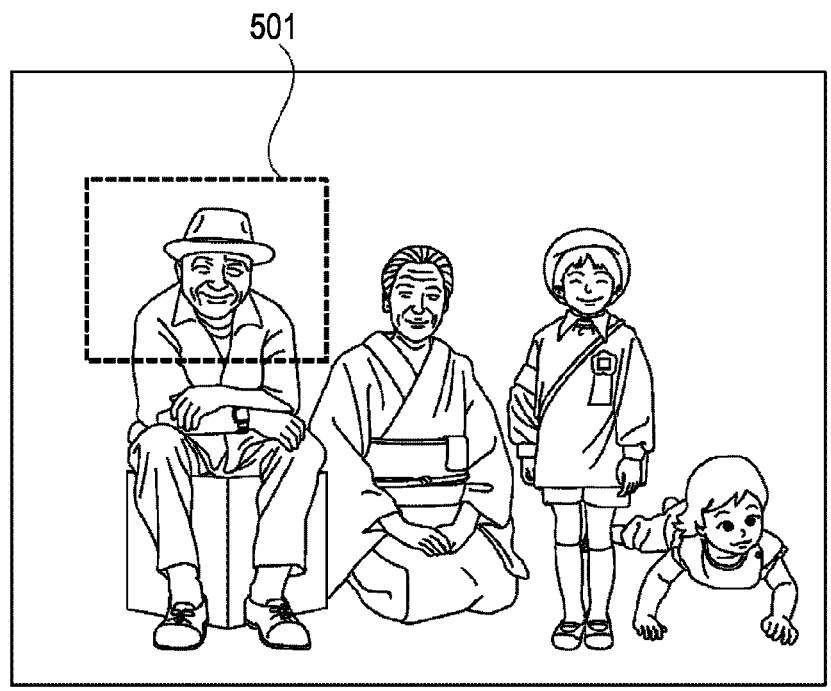
FIG. 5 illustrates an exemplary image displayed on a display screen in the first exemplary embodiment of the present invention.
Figure 6:
FIG. 6 illustrates an exemplary image displayed on the display screen in the first exemplary embodiment of the present invention.

According to this example, when the power button 301 of the digital camera 100 is pressed and the mode selection switch 205 is set to the reproducing mode, an image including the latest shooting date/time may be displayed on the display screen 201. In one version, the multifunction lever 303 may be designed according to such a mechanism that, after the multifunction lever 303 has been pulled (or rotated), the lever is forced to automatically return to an original position by itself. Therefore, the manipulation of pulling the multifunction lever 303 can be repeated. The following description is thus made on an assumption that a direction in which the lever is pulled (or rotated) clockwise corresponds to an enlargement direction, and a direction in which the lever is pulled (or rotated) counterclockwise corresponds to a reduction direction. When the multifunction lever 303 is manipulated in the reduction direction (i.e., counterclockwise) in the state that one image is displayed on the display screen 201, plural images having been taken and recorded in the camera are displayed on the display screen 201. The number of images displayed at that time may be previously set as a fixed value depending on a reduction rate. On the other hand, when the multifunction lever 303 is manipulated in the enlargement direction (i.e., clockwise) in the state that plural images are displayed on the display screen 201, a selected one of the plural images may be displayed on the whole of the display screen 201. When the multifunction lever 303 is further manipulated in the enlargement direction in the state that one image is displayed on the display screen 201, a part of the one image, as indicated by a dotted-line rectangle in FIG. 5 may be displayed on the display screen 201 in an enlarged scale, as illustrated in FIG. 6. A center of the partial area displayed in the enlarged scale is the same as a center of the image that has been displayed immediately before the partial area is displayed in the enlarged scale. A rate at which the partial image is enlarged per manipulation of the multifunction lever 303 is preset as a fixed value. By further manipulating the multifunction lever 303 in the enlargement direction, therefore, the partial area can be displayed on the display screen 201 in a further enlarged scale in accordance with the constant enlargement rate. Conversely, by manipulating the multifunction lever 303 in the reduction direction in the state that the partial area is displayed on the display screen 201 in an enlarged scale, the partial area is displayed on the display screen 201 in the state returned (i.e., reduced) from the preceding enlarged state. Accordingly, a user can display the partial area on the display screen 201 at a preselected enlarged scale by repeatedly manipulating the multifunction lever 303 in the enlargement direction and/or the reduction direction. When the user wants to move the position of the partial area to be displayed on the display screen 201, the user manipulates the cross-arrow key 202. The position of the partial area displayed on the display screen 201 can be moved through an amount (e.g., distance) corresponding to a grid interval value, which is preset as a fixed value, by pressing any of the upward key 207, the downward key 209, the leftward key 206, and the rightward key 208. The amount and the direction of the movement can be adjusted by repeatedly pressing the cross-arrow key 202 in continuation. Additionally, by pressing the leftward key 206 or the rightward key 208 of the cross-arrow key 202 in the state that one image is displayed on the display screen 201, a plurality of images stored in the digital camera 100 can be displayed on the display screen 201 in sequence.

In the digital camera 100, as described above, the range of the partial area can be designated in accordance with the manipulation of the multifunction lever 303 in the enlargement direction or the reduction direction, and the position of the partial area can be designated in accordance with the manipulation of pressing the cross-arrow key 202. Accordingly, the user can successively perform procedures of instructing display in an enlarged scale to closely confirm the image, and designating the enlarged partial area as a target for rating. Thus, the manipulation on the part of the user may be simplified.

The following description is made of an example of an operation for designating the partial area included in the image and setting rating information, which represents, e.g., whether photographing has succeeded or whether the condition of the taken image is satisfactory, in the digital camera 100 in accordance with user's manipulations.

According to this example, first, one image is displayed on the whole of the display screen 201 with the manipulation made on the digital camera 100. Then, a particular partial area of the image is displayed on the display screen 201 in an enlarged scale when the multifunction lever 303 is manipulated in the enlargement direction and/or when the cross-arrow key 202 is pressed. FIG. 6 illustrates, for example, a state that the partial area, indicated by the dotted-line frame 501 in FIG. 5, is displayed on the display screen 201 in an enlarged scale. If the partial area of the image displayed in the enlarged scale is satisfactory to the user, for example for the reason that a partial image is a smiling face, is in focus, or is taken as per intended by the user, the user instructs setting of "partial OK". In practice, the user presses the set button 204 to input an instruction for setting of "partial OK" into the digital camera 100. In response to the pressing of the set button 204, the digital camera 100 sets "partial OK" as a mark type for the partial area of the image which is currently displayed. Correspondingly, a "partial OK mark" 701 is displayed on the display screen 201, as illustrated in the example shown in FIG. 7, to indicate that the currently displayed partial area of the image 700 is "OK". By confirming the displayed partial area of the image and the displayed "partial OK mark" 701, the user can recognize that "partial OK" has been set for the relevant partial area.

On the contrary, if the partial area of the image displayed in the enlarged scale is unsatisfactory to the user, for example for the reason that a partial image is a face with the eyes closed, is out of focus, or provides the photographing result not as per intended by the user, the user instructs setting of "partial NO". In practice, the user presses the set button 204 to input an instruction for setting of "partial NO" into the digital camera 100. In this exemplary embodiment, when the set button 204 is repeatedly pressed, the setting of "partial OK" and the setting of "partial NO" appear in turn. In response to the pressing of the set button 204, the digital camera 100 sets "partial NO" as a mark type for the partial area of the image which is currently displayed. Correspondingly, a "partial NO mark" 801 is displayed on the display screen 200, as illustrated in the example shown in FIG. 8, to indicate that the currently displayed partial area of the image is "NO". By confirming the displayed partial area of the image and the displayed "partial NO mark" 801, the user can recognize that "partial NO" has been set for the relevant partial area.

Further, the user can set a "partial OK level" and a "partial NO level" as values each representing the extent to which the photographing result in the partial area of the image is satisfactory or unsatisfactory to the user, respectively.

Figure 17:
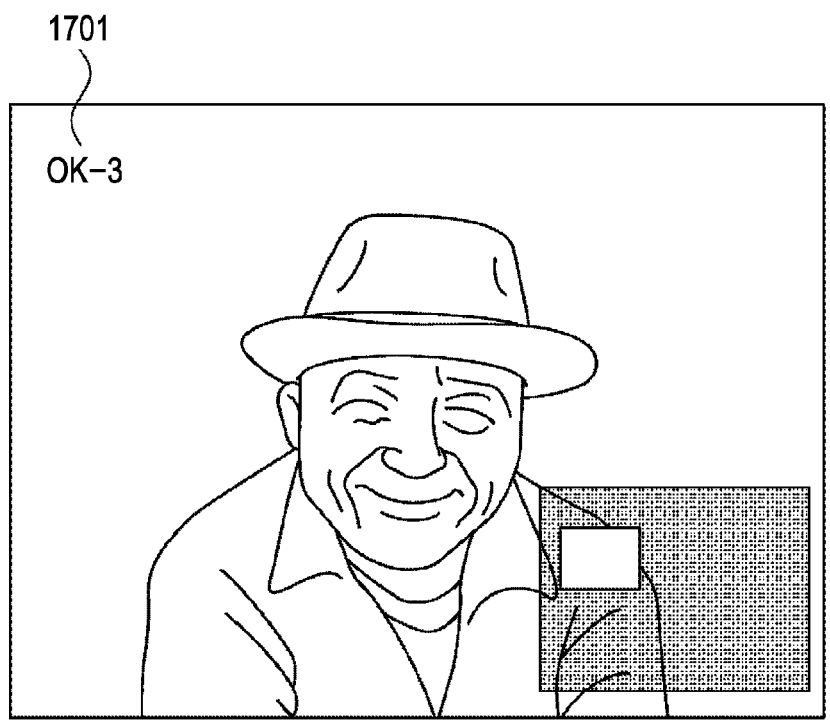
FIG. 17 illustrates an exemplary image displayed on the display screen in the first exemplary embodiment of the present invention.

More specifically, in the digital camera 100, the "partial OK level" and the "partial NO level" are set respectively when the upward key 207 and the downward key 209 of the cross-arrow key 202 are pressed with the function button 212 kept pressed in the state that the partial area is displayed on the display screen 201 in the enlarged scale. Each time the upward key 207 is pressed, the "partial OK level" is increased one step, and each time the downward key 209 is pressed, the "partial OK level" is decreased one step. For example, if the user is satisfied with the partial area, displayed as illustrated in the example shown in FIG. 7, to a large extent and presses the upward key 207 three times, the "partial OK level" is set to 3. Then, an indication "OK-3" 1701 is displayed as illustrated in the example shown in FIG. 17. Alternatively, a level value can be dynamically displayed each time the upward key 207 or the downward key 209 is pressed.

Thus, the user can set the rating in fine steps for the partial area of the image.

If the user determines that the partial area of the image displayed in the enlarged scale is significantly neither satisfactory ("OK") nor unsatisfactory ("NO") to the user, nothing may be set as the mark type for the partial area. In practice, the user presses the set button 204 to input an instruction for setting of "no designation" into the digital camera 100. In this exemplary embodiment, when the set button 204 is repeatedly pressed, the settings of "partial OK" and "partial NO", as well as the setting of "no designation" appear in turn. Upon the setting of "no designation" being selected, the partial area of the image is simply displayed on the display screen 201 in the same state as that when the partial area of the image is ordinarily displayed in the enlarged scale. By confirming the partial area of the image displayed in such a state, the user can recognize that nothing has been set for the displayed partial area.

After the completion of the setting of the mark type for the partial area of the image displayed on the display screen 201 in the enlarged scale, the multifunction lever 303 may be manipulated such that the enlargement rate is returned to the original value and the image is displayed in the ordinary size, as illustrated in the example shown in FIG. 5. Alternatively, the position of the partial area can be changed by manipulating the cross-arrow key 202 and the "partial OK" and the "partial NO" can be successively designated for a plurality of partial areas in the same image by repeating the above-described manipulations. Further, the cross-arrow key 202 can be manipulated so as to change over (i.e., switch) the image currently displayed on the display screen 201 to the next image. As still another option, the operating mode can be shifted from the reproducing mode to the photographing mode by manipulating the mode selection switch 205 or the shutter button 302.

When a subsequent manipulation is performed after the completion of the setting of the mark type for the partial area of the image which is displayed on the display screen 201 in the enlarged scale, the digital camera 100 automatically records the mark type in the storage memory 110 together with position information of the partial area in relation to the image data.

Figure 18:
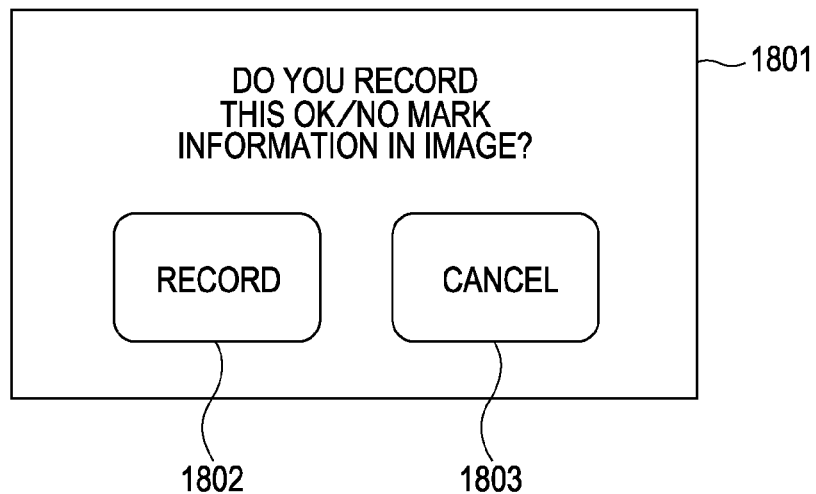
FIG. 18 illustrates an example of a recording confirmation dialog in the first exemplary embodiment of the present invention.

As an alternative, when a subsequent manipulation is performed after the completion of the setting of the mark type for the partial area of the image which is displayed on the display screen 201 in the enlarged scale, a recording confirmation dialog 1801, illustrated in the example shown in FIG. 18, can be displayed to prompt the user to select whether the mark type is to be recorded or not. If a "record" button 1802 is pressed, the digital camera 100 automatically records the mark type together with the position information of the partial area in correspondence to the image data. On the other hand, if a "cancel" button 1803 is pressed, the mark type is not recorded.

While the first exemplary embodiment has been described in connection with the example in which the mark type is represented by using character strings such as "OK" and "NO", a manner of representing the mark type is not limited to the use of character strings. For example, the mark type can also be displayed by using icons in different figures, or by using different frame colors or shapes.

Further, while the first exemplary embodiment has been described in connection with the example in which the range of the partial area is designated by using the zooming lever to display the image in an enlarged scale, a manner of designating the range of the partial area is not limited to the use of the zooming lens. For example, the image can be divided so as to display grid lines at predetermined intervals, and one of divided areas can be designated by using, e.g., the cross-arrow key or the pointing device.

Figure 11:
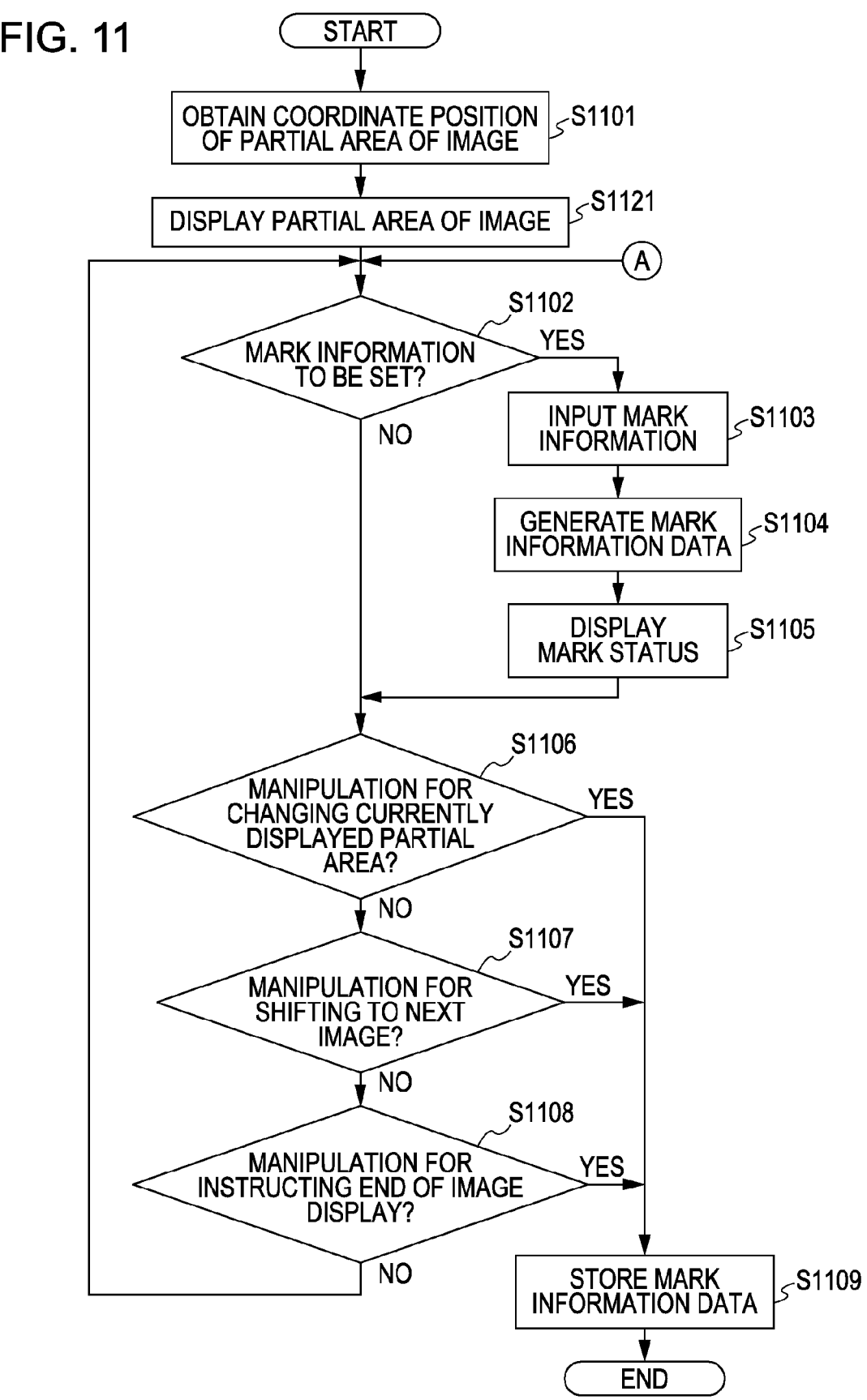
FIG. 11 is a flowchart illustrating an example of the operation of setting mark information in a partial area of the image in the first exemplary embodiment of the present invention.

An example of procedures for setting the mark type, such as "OK" and "NO" indicating the rating results, for each partial area of the image and recording the mark type in relation to the image file in the digital camera 100 of this exemplary embodiment will be described below with reference to a flowchart of FIG. 11.

In step S1101, the area recognizing device 402 recognizes a partial area which has been designated, regarding the image currently displayed on the display screen 201, in response to the above-described manipulations of the cross-arrow key 202 and the multifunction lever 303, and then obtains the position of the partial area. In step S1121, the display control device 417 displays the designated partial area on the display device 107, for example as illustrated in FIG. 5, by drawing a rectangle, which represents the partial area, on the entire image. It is herein assumed that coordinates (200,400) indicating a lower left corner of the rectangle and coordinates (800, 900) indicating an upper right corner of the rectangle are obtained as data representing the position of the partial area. In step S1102, the control device 406 determines whether the mark type is to be set for the partial area. Specifically, the control device 406 detects whether the set button 204 in the manipulating device 108 is pressed. If the pressing of the set button 204 is detected, the control device 406 determines that the mark type is to be set (YES in step S1102), and processing then shifts to step S1103. If the pressing of the set button 204 is not detected, the control device 406 determines that the mark type is not to be set (NO in step S1102), and then processing shifts to step S1106. In step S1103, the control device 406 receives an input of the mark type set for the partial area. Each time the pressing of the set button 204 is detected, the input mark type is cyclically changed in the sequence of "no setting", "partial OK", and "partial NO". Assuming the state illustrated in FIG. 5, for example, because of "no setting" at that time, if the pressing of the set button 204 is detected once, "partial OK" is input as the mark type. In step S1103, the control device 406 can further receive inputting of a mark level that represents an extent of the user's satisfaction in association with the mark type. In such a case, when the upward key 207 or the downward key 209 of the cross-arrow key 202 is pressed with the function button 212 kept pressed, a value of the "partial OK level" or the "partial NO level" may be set correspondingly. Then, in step S1104, the mark information generating device 403 generates mark information data in accordance with the mark type that has been input in step S1103, and stores the generated mark information data in a mark information data table 1200, as illustrated for example in FIG. 12. Herein, the mark information generating device 403 newly generates "Area_1" as an area ID 1201 for the partial area. Further, the mark information generating device 403 generates mark information data 1204 as one set including the area ID 1201, an area position 1202, and a mark type 1203 in relation to one another. The area position 1202 is provided by the coordinates (200,400) of the lower left corner and the coordinates (800,900) of the upper right corner, and the mark type 1203 is provided by "partial OK level".

When the "partial OK level" or the "partial NO level" are set, one set of data including the "partial OK level" or the "partial NO level" as well is stored in a mark information data table 1600, as illustrated for example in FIG. 16. The mark information data table 1600 includes an area ID 1601, an area position 1602, a mark type 1603, and a mark level 1605 representing a degree of "partial OK" or a degree of "partial NO" as a numerical value. As in the case of the example shown in FIG. 12, the mark information data illustrated in the example shown in FIG. 16 may also be managed as one set of data 1604 including the area ID, the area position, the mark type, and the mark level in relation to one another for each partial area.

Thus, the rating for the partial area of the image may be held in fine steps (i.e., increments). Accordingly, when the user tries to confirm the same image later, the user can obtain abundant information and can more easily recognize the result of rating (i.e., evaluation) for the image, which has been performed before.

Figure 7:
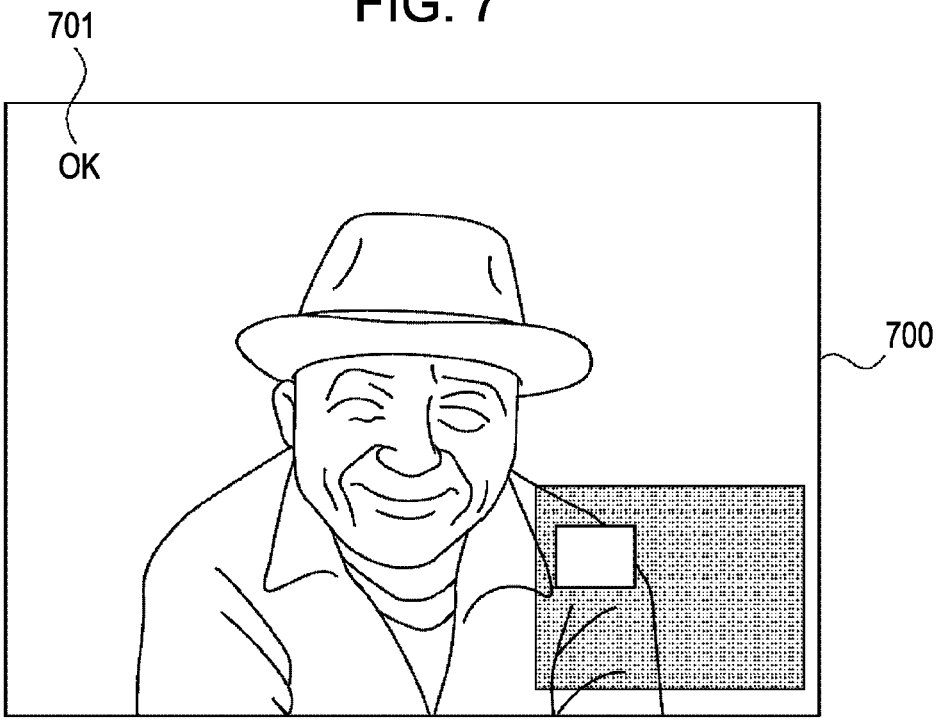
FIG. 7 illustrates an exemplary image displayed on the display screen in the first exemplary embodiment and a second exemplary embodiment of the present invention.
Figure 13:
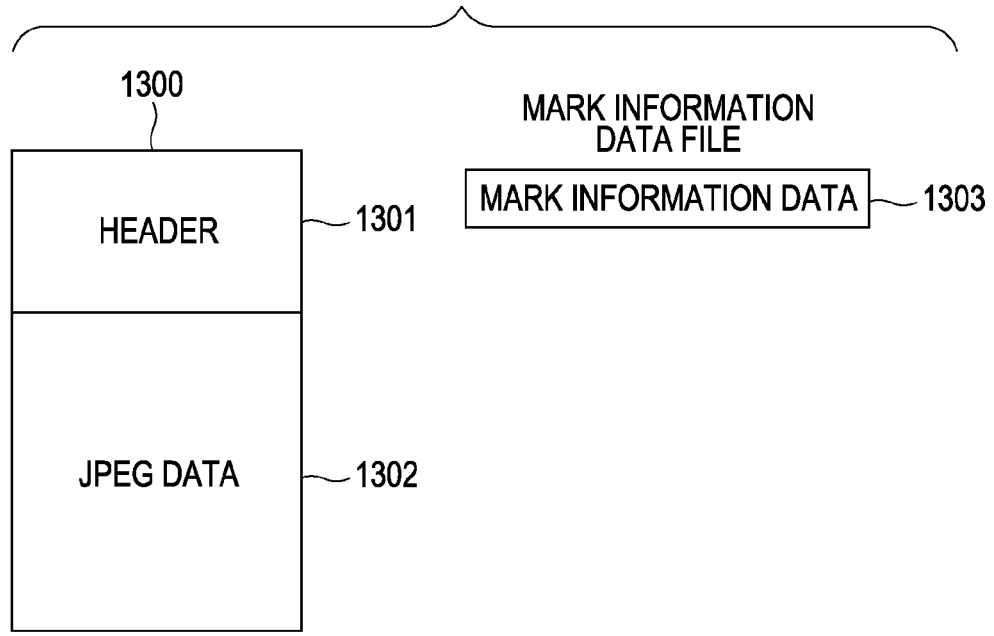
FIG. 13 illustrates one example of the structure of an image file in the first exemplary embodiment of the present invention.
Figure 14:
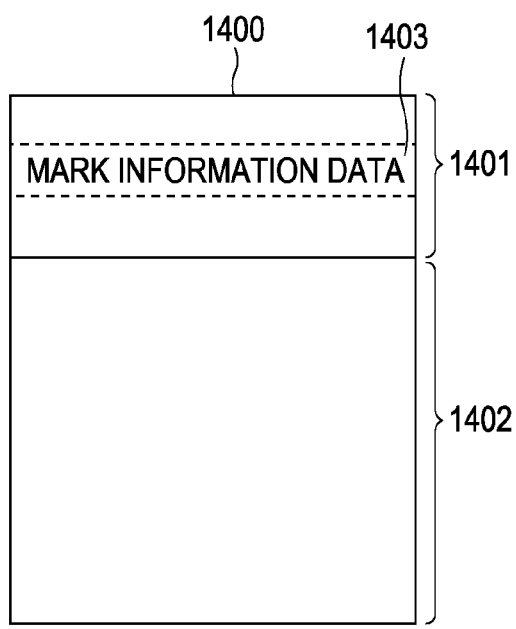
FIG. 14 illustrates another example of the structure of the image file in the first exemplary embodiment of the present invention.

In step S1105, the display control device 417 displays a mark status on the display screen 201 in accordance with the mark information data generated in S1104. In FIG. 7, for example, the "partial OK" 701 is displayed as the mark type on the image of the partial area. In step S1106, the control device 406 detects whether any manipulation for changing the position and/or the range of the currently displayed partial area has been performed by using the cross-arrow key 202 or the multifunction lever 303. If the manipulation for changing the position and/or the range of the currently displayed partial area is detected (YES in step S1106), the control device 406 shifts processing to step S1109. If the changing manipulation is not detected (NO in step S1106), the control device 406 shifts processing to step S1107. In step S1107, the control device 406 detects whether the manipulation for changing the image to be displayed on the display device 107 to the next image has been performed by using, e.g., the cross-arrow key 202. If the manipulation for changing the image to the next image is detected (YES in step S1107), the control device 406 shifts processing to step S1109. If the changing manipulation is not detected (NO in step S1107), the control device 406 shifts processing to step S1108. In step S1108, the control device 406 detects whether there is any instruction for bringing the operation of reproducing and displaying the image to an end, such as a change from the reproducing mode to the photographing mode with the manipulation of, e.g., the mode selection switch 205 or the shutter button 302, or turning-off of power with the manipulation of the power button 301. If the instruction for bringing the image display to an end is detected (YES in step S1108), the control device 406 shifts processing to step S1109. If the instruction for bringing the image display to an end is not detected (NO in step S1108), the control device 406 returns processing to step S1102. In step S1109, the mark information data table 1200 containing the mark information data 1204, which has been generated in step S1104 by the mark information generating device 403, is stored in correspondence with (i.e., in relation to), the image file. For example, as illustrated in FIG. 13, the image data generating device 404 may generate a mark information data file 1303 from the mark information data 1204, and the data storing device 405 stores the mark information data file 1303 in the storage memory 110 in correspondence with (i.e., in relation to), an image file 1300 which includes a header 1301 and JPEG data 1302. Alternatively, as illustrated in the example shown in FIG. 14, mark information data 1403 can be additionally written into a header region 1401 of an image file 1400, including image data 1402 as well, such that the header region 1401, the image data 1402, and the mark information data 1403 may be stored as one image file. Before the mark information data is stored in step S1109, the above-described recording confirmation dialog illustrated in the example shown in FIG. 18 can also be displayed such that the storing process of step S1109 is executed when the user instructs "recording" of the mark information data (i.e., presses the "record" button).

With the first exemplary embodiment, as described above, the result of partly rating the image by the user can be recorded in relation to the image. Accordingly, when the image is reproduced later, the recorded rating result can be read out and displayed, thus enabling the user to more simply confirm the condition of the taken image. Further, it may be possible to substantially eliminate efforts on the part of the user to display the image in an enlarged scale and to confirm specific features of the image each time the user reproduces the image at a later point in time. Aspects accord to the embodiment of the present invention may also enable a rating of a partial area of an image to be held with relatively simple manipulation.

A second exemplary embodiment will be described below in connection with the case where the image file, which is already recorded in relation to the mark information data as described above in the first exemplary embodiment, is reproduced, and the mark information data is updated and recorded.

Figure 9:
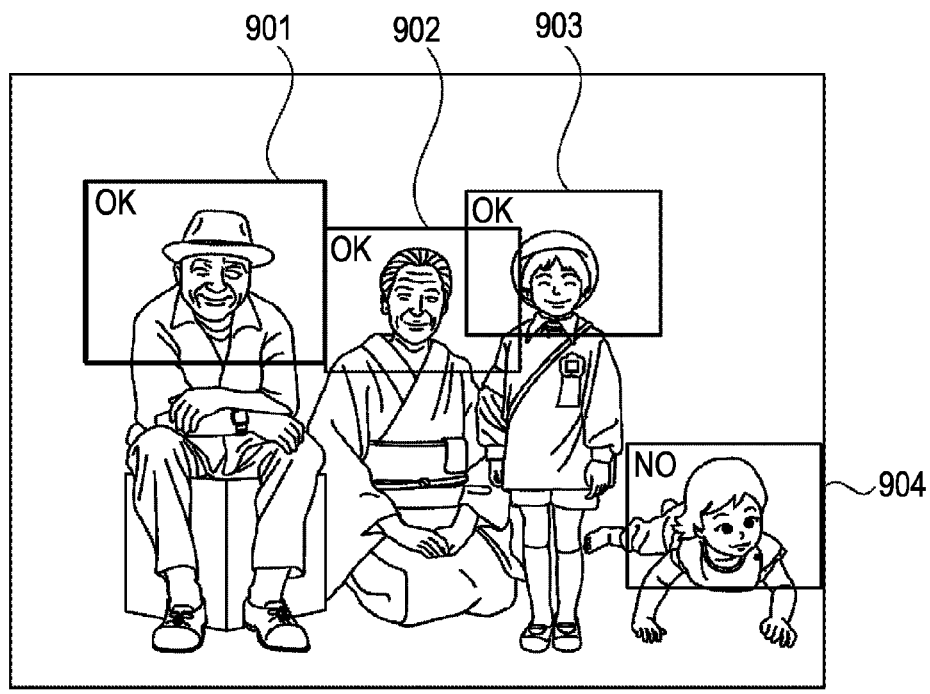
FIG. 9 illustrates an exemplary image displayed on the display screen in the second exemplary embodiment of the present invention.

First, as described above in the first exemplary embodiment, the digital camera 100 reads the image file, which is already recorded in relation to the mark information data, and displays an image on the display screen 201. For example, when four sets of mark information data are recorded in relation to the image file, the digital camera 100 reads the four sets of mark information data, illustrated for example in FIG. 12, which are recorded in relation to the image file. Then, the digital camera 100 may display rectangular frames, which represent respective partial areas, and mark types 901 to 904 on the display screen 201 in accordance with the four sets of mark information data, as illustrated in the example shown in FIG. 9. In the initial state, one of the partial areas represented by the four sets of mark information data, which has a minimum area ID, may be set as the partial area being selected at that time, and the rectangular frame representing the relevant partial area may be displayed in a different shape or nature (e.g., a thick line or a different color) from that of the other partial areas, as indicated by 901 in the example shown in FIG. 9.

Figure 8:
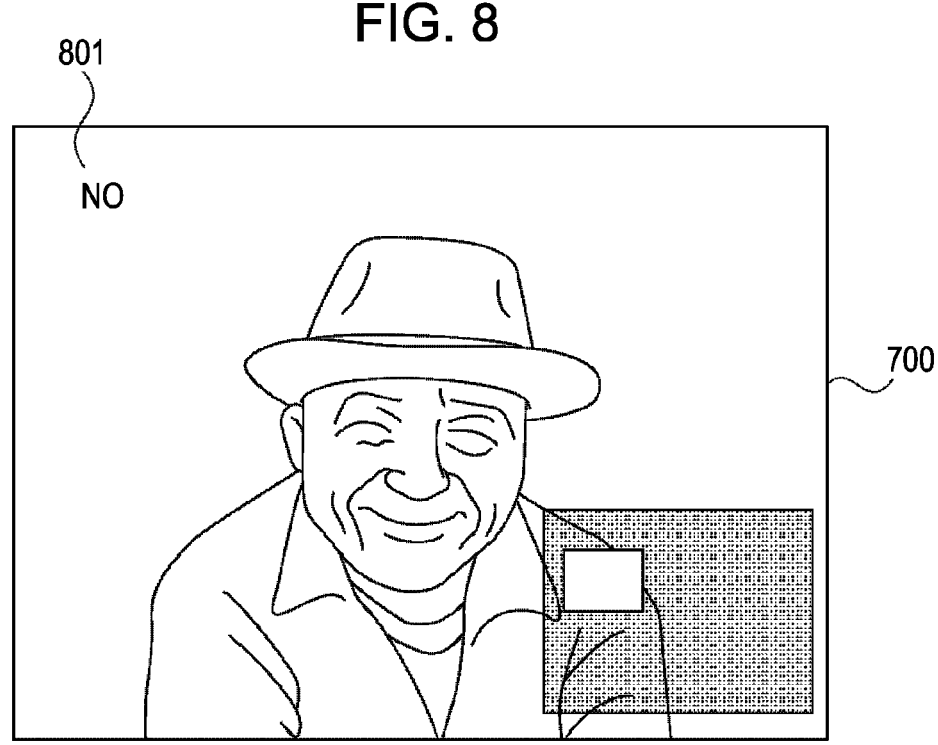
FIG. 8 illustrates an exemplary image displayed on the display screen in the first exemplary embodiment and the second exemplary embodiment of the present invention.
Figure 10:
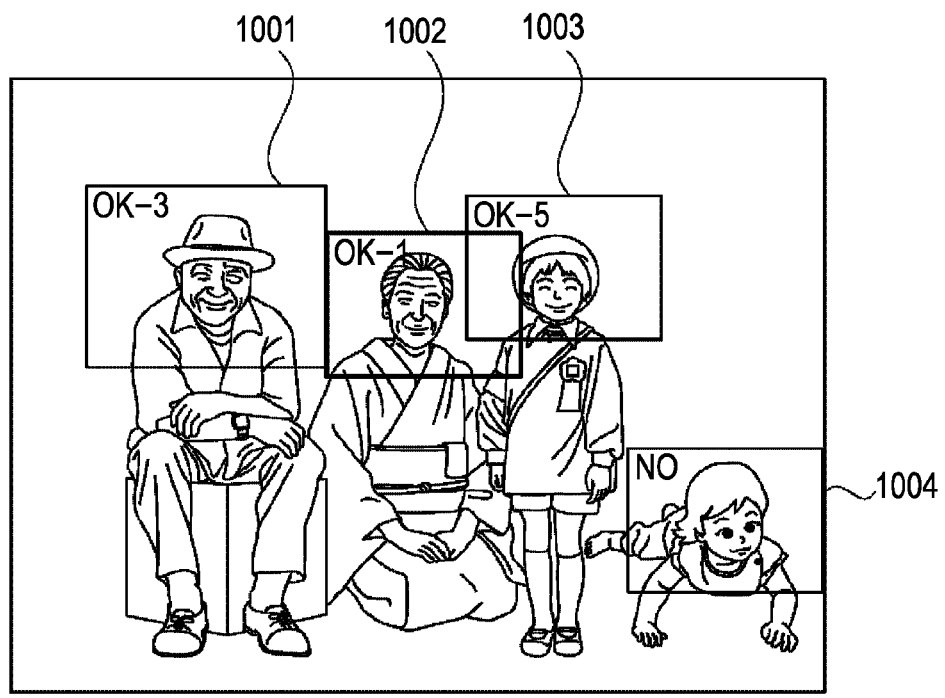
FIG. 10 illustrates an exemplary image displayed on the display screen in the second exemplary embodiment of the present invention.

Further, when the "partial OK level" or the "partial NO level" is set in the partial area of the image, the mark level may also displayed as illustrated in the example shown in FIG. 10. Referring to FIG. 10, a partial area 1001 has a "partial OK level" of 3. A partial area 1002 has a "partial OK level" of 1 and is in a selected state. A partial area 1003 has a "partial OK level" of 5, and a partial area 1004 is determined to be "partial NO". When the leftward key 206 or the rightward key 208 is pressed in the state that the function button 212 is held pressed, the digital camera 100 operates so as to successively move the partial area in the selected state so that the user can select a partial area. Further, in the digital camera 100, when the set button 204 is pressed in the state that the function button 212 is held pressed, the partial area in the selected state may be displayed on the display screen 201 in an enlarged scale. For example, as illustrated in FIG. 7, the selected partial area may be enlarged and displayed on the display screen 201 along with the mark type and the mark level which are recorded in correspondence with (i.e., in relation to) the selected partial area. Herein, when the user wants to change the mark type and/or the mark level which are currently set in relation to the selected partial area, the user presses the set button 204. In the digital camera 100, each time the set button 204 is pressed, the mark type is changed. For example, although FIG. 7 illustrates that "partial OK" is set for the partial area 700, it is assumed herein for the purposes of explanation that, as a result of closely viewing the partial area 700, the user finds an unsatisfactory feature in the partial area 700 and wants to change the mark type from "partial OK" to "partial NO". In such a case, the user can change the setting of the mark type for the partial area to "partial NO" by pressing the set button 204. With the pressing of the set button 204, the mark type "NO" indicating that the partial area 700 is determined to be "partial NO" is displayed as shown in the example of FIG. 8. When the user further presses the set button 204, the mark type may be changed to "no designation". Further, after completing the confirmation or the change of the mark information data for each of the partial areas, the user presses the rightward key 208 or the leftward key 206 of the digital camera 100. In response to the key pressing, the digital camera 100 operates so as to update the newly set mark information data and to change over (i.e., switch) the image such that the next image is displayed on the display screen 201. Alternatively, when the mode selection switch 205 or the shutter button 302 is manipulated, the operating mode can be shifted from the reproducing mode to the photographing mode after updating the mark information data.

Figure 15:
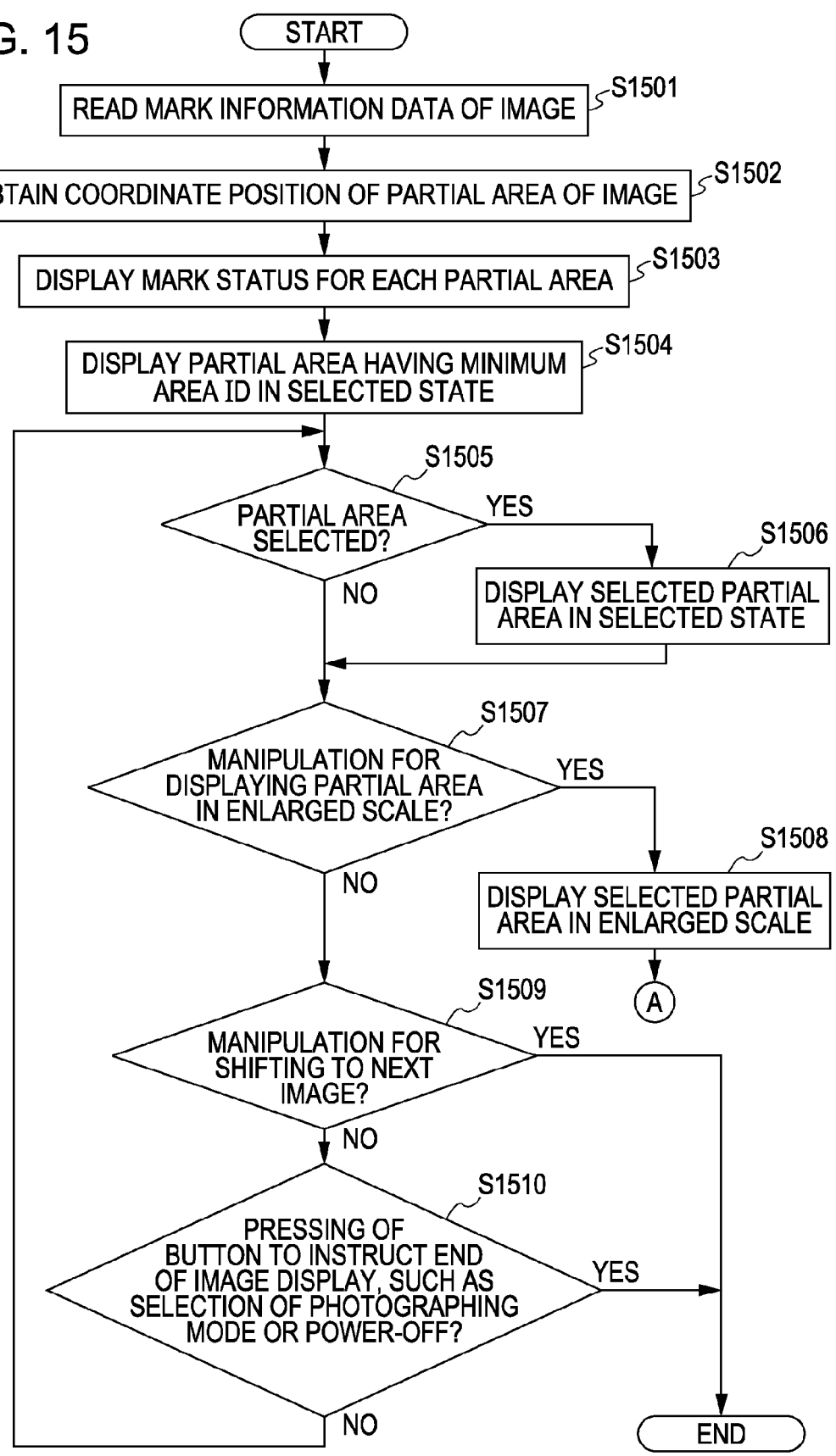
FIG. 15 is a flowchart illustrating an example of the operation of updating the mark information set in the partial area of the image in the second exemplary embodiment of the present invention.

An example of an operation for reproducing and displaying an image and updating the mark information data, which has already been recorded in relation to the displayed image, will be described below with reference to a flowchart of FIG. 15.

In step S1501, if the mark information data is recorded in relation to the image file which is to be displayed on the display screen 201, the image data analyzing device 401 reads the recorded mark information data. In step S1502, the area recognizing device 402 refers to the mark information data and obtains the coordinates representing the position of each of the partial areas. In step S1503, the display control device 417 draws a frame line indicating each partial area on the image. Further, the display control device 417 draws the mark type and the mark level, which are obtained from the mark information data having been read in step S1501, near the partial area. In step S1504, the display control device 417 sets one of the partial areas, which has a minimum area ID, into the selected state and draws the frame line representing the relevant partial area in a different shape, such as a thick line, from that of the other partial areas, thus emphasizing the partial area in the selected state. Further, the display control device 417 displays the image on the display screen 201, as illustrated in the example shown in FIG. 10. In step S1505, the control device 406 detects whether any manipulation for selecting the partial area has been input. For example, in this step S1505, the control device 406 may detect whether the rightward key 208 or the leftward key 206 has been pressed while in the state where the function button 212 is kept pressed. If the pressing of the rightward key 208 or the leftward key 206 is detected (YES in step S1505), the control device 406 shifts processing to step S1506. If the pressing of the rightward key 208 or the leftward key 206 is not detected (NO in step S1505), the control device 406 shifts processing to step S1507. In step S1506, the control device 406 selects the partial area upon receiving the manipulation made by the user. Here, each time the rightward key 208 is pressed, the partial area is successively selected from one to another in the descending order of the area ID. Each time the leftward key 206 is pressed, the partial area is successively selected from one to another in the ascending order of the area ID. Further, the frame line representing the selected partial area is drawn in a different shape from that of the other partial areas so as to display the relevant partial area on the display screen 201 in a manner emphasizing the fact that the relevant partial area is in the selected state. Processing then proceeds to step S1507. In step S1507, the control device 406 detects whether the instruction for displaying the partial area, selected in step S1506, in an enlarged scale has been input. For example, in this step S1507, the control device 406 may detect whether the function button 212 and the set button 204 are pressed at the same time. If the instruction for displaying the partial area in an enlarged scale is detected (YES in step S1507), the control device 406 shifts processing to step S1508. If the instruction is not detected (NO in step S1507), the control device 406 shifts processing to step S1509. In step S1508, the display control device 417 displays the partial area, which has been selected in step S1506, on the display screen 201 in the enlarged scale. Herein, the mark type and the mark level both recorded in correspondence to the partial area may be displayed together. Then, the control device 406 successively executes the processes of step S1102 and the steps subsequent thereto in the flowchart shown in the example of FIG. 11 to newly set the mark type and the mark level for the partial area and to store them after update. In the processing executed in this exemplary embodiment, each time the set button 204 is pressed, the value of the mark type may be cyclically changed in step S1103 starting from the value of the mark type which is currently set for the partial area. In the case of the mark information data 1604 in the example shown in FIG. 16, each time the set button 204 is pressed, the mark type is successively changed from "partial OK" to "partial NO" and then to "no designation". Further, the mark level 1605 shown in the example of FIG. 16 can also be cyclically changed in a similar manner. In step S1109 of FIG. 11, the newly set mark type and mark level are recorded after updating the existing values. Returning to FIG. 15, in step S1509, the control device 406 detects whether the manipulation for changing the image currently displayed on the display screen 201 to the next image has been performed. If the manipulation for changing the image to the next image is detected (YES in step S1509), the control device 406 brings the process of displaying the current image to an end. If the changing manipulation is not detected (NO in step S1509), the control device 406 shifts processing to step S1510. In step S1510, the control device 406 detects whether there is any instruction for bringing the operation of reproducing and displaying the image to an end, such as a change from the reproducing mode to the photographing mode with the manipulation of, e.g., the mode selection switch 205 or the shutter button 302, or turning-off of power with the manipulation of the power button 301. If the instruction for bringing the image display to an end is detected (YES in step S1510), the control device 406 brings the current image display process to an end. If the instruction for bringing the image display to an end is not detected (NO in step S1510), the control device 406 returns processing to step S1505.

Figure 19:
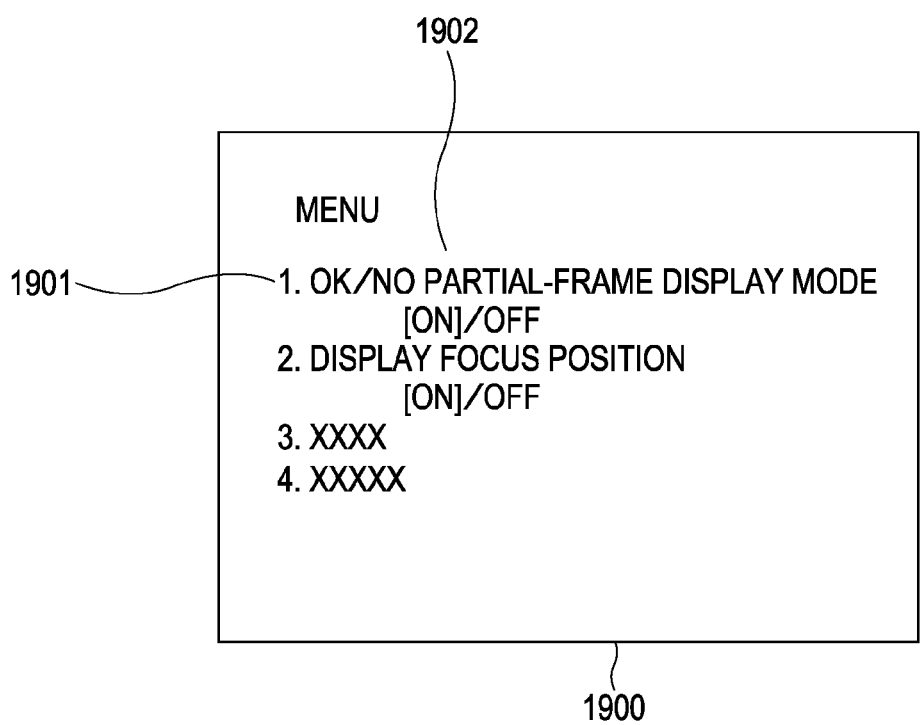
FIG. 19 illustrates an example of a menu screen in the second exemplary embodiment of the present invention.

The second exemplary embodiment has been described above in connection with the case where, when displaying one image on the display screen 201, if the mark information data is recorded in relation to the relevant image, the partial area, the mark type, etc. are also automatically displayed based on the mark information data. However, determination as to whether the information based on the mark information data is to be displayed together when an image is displayed, can also be previously added as one of environment settings. In the digital camera 100, for example, a menu may be displayed on the display screen 201, as indicated by 1900, upon the menu button 203 being pressed. In the menu, various menu items 1901 may be displayed, as illustrated in the example shown in FIG. 19, which may be provided to perform various function and environment settings in the digital camera 100. For example, "OK/NO partial-frame display mode setting" may be added as one of the menu items. When "ON" is selected in a menu selection dialog 1902, the information based on the mark information data is also displayed, as described above, when an image is displayed. When "OFF" is selected, the information based on the mark information data is not displayed and the mark information data cannot be updated any more. Thus, by selecting "OFF", information that may not be necessary is not displayed, and the user may be able to more conveniently view the image without excessive interference from additional display when the user simply wants to confirm the image.

With the second exemplary embodiment, as described above, when an image is reproduced, the rating result for each of partial areas in the image is also displayed. Further, particulars of the rating result can be changed.

A third exemplary embodiment will be described in connection with the case where, in the digital camera 100, the image file already recorded in relation to the mark information data, as described above in the foregoing exemplary embodiments, is managed in accordance with the mark information data. It is to be noted that a description of configuration and components similar to those in the foregoing exemplary embodiments is not repeated here.

Figure 20:
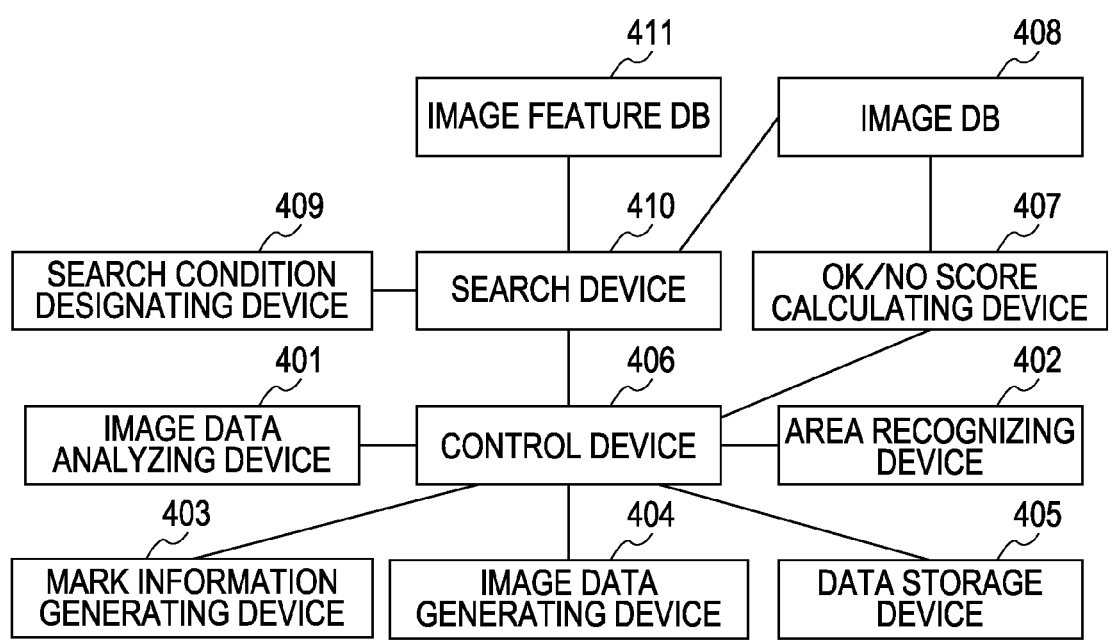
FIG. 20 is a block diagram illustrating an example of the configuration of a data processing device according to a third exemplary embodiment of the present invention.

FIG. 20 is a block diagram illustrating an example of the configuration of a data processing device 104 according to the third exemplary embodiment. Note that a description of components similar to those in FIG. 4 is not repeated here. Referring to FIG. 20, the data processing device 104 includes an OK/NO score calculating device 407 configured to calculate an OK/NO score from the mark information, and an image database (DB) 408 configured to manage information regarding each image, such as the calculated OK/NO score, the mark information indicating "partial OK/NO", a keyword, etc. Further, the data processing device 104 includes a search condition designating device 409 configured to designate a condition for searching for the image, a search device 410 configured to search for the image, and an image feature database (DB) 411 configured to manage feature information of the image and including, for example, at least one of a face DB, an image feature information DB, etc. An image data analyzing device 401 analyzes the image to obtain various types of feature information, and stores the obtained feature information in the image feature DB in relation to the image. For example, the image data analyzing device 401 may detect a face or a person included in the image to obtain feature information regarding the face through calculations, and to obtain feature information based on a color distribution and a brightness distribution through calculations. Then, the data processing device 104 may store the feature information regarding the face in the face DB in relation to the image, and may also store the feature information based on the color distribution and the brightness distribution in the image feature information DB in relation to the image.

The following description is made of an example of an operation for, in the digital camera 100, extracting and employing an image file, which has succeeded or failed in photographing, from among a plurality of image files assigned with the mark information data.

Figure 21:
FIG. 21 illustrates an example of images displayed on the display screen in the third exemplary embodiment of the present invention.
Figure 22:
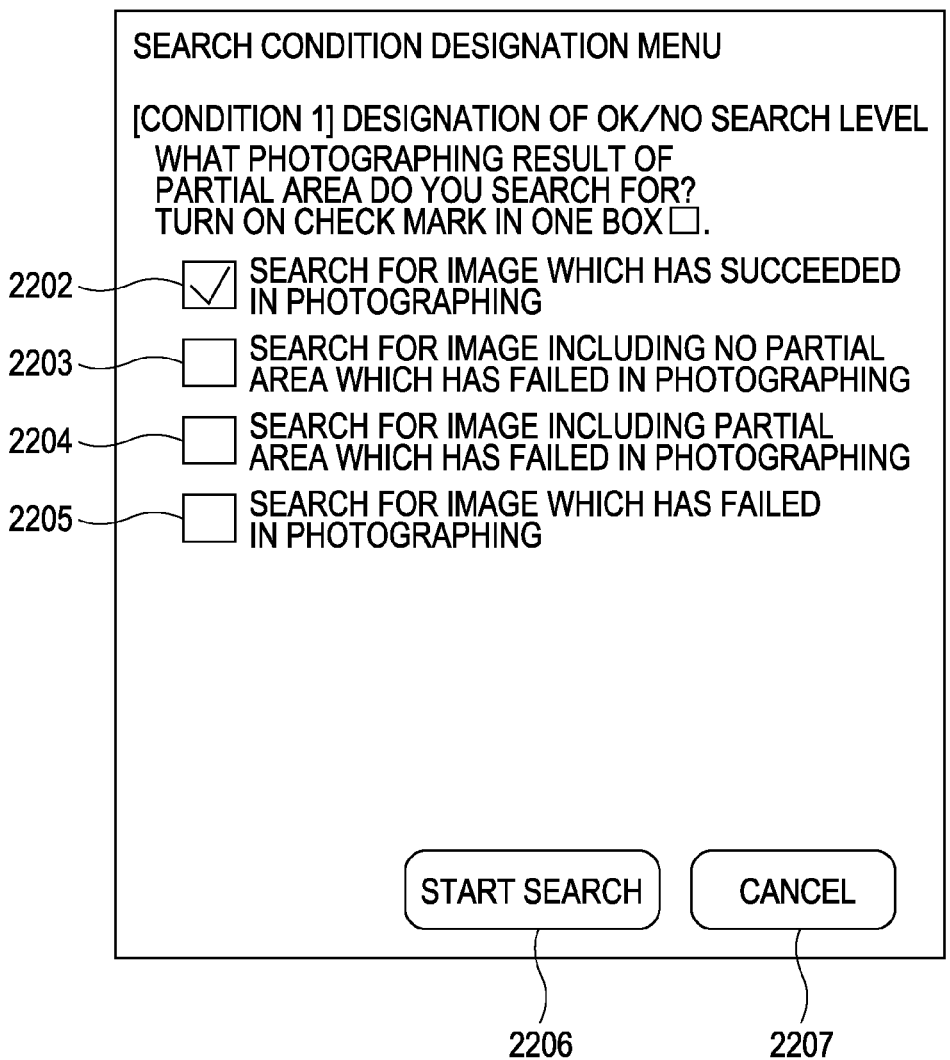
FIG. 22 illustrates one example of a search-condition designation menu screen displayed on the display screen in the third exemplary embodiment of the present invention.

According to this example, as in the above-described exemplary embodiments, an image (e.g., one image) is displayed on the display screen 201 of the digital camera 100. When the multifunction lever 303 is manipulated in the reduction direction (counterclockwise) in the state that one image is displayed, a plurality of images stored in the storage memory 110 may be displayed, as illustrated in the example shown in FIG. 21. When the user presses the menu button 203 at that time, a search condition designation menu illustrated in the example shown in FIG. 22 may be displayed on the display screen 201. FIG. 22 illustrates an example of a menu for setting the search condition. When the user selects one of the displayed search items and turns on a check mark in a corresponding check box, the digital camera 100 responsively operates so as to set the search condition. When pressing of a "cancel" button 2207 is detected, the digital camera 100 stops a search process. On the other hand, when pressing of a "start search" button 2206 is detected, the digital camera 100 starts the process of searching for the image file in match with the search condition. If a check mark is turned on for a search item 2202, the image file assigned with only the partial OK mark is searched for. In other words, the image is searched for which includes partial areas that have been all determined to be "partial OK" by the user. If a check mark is turned on for a search item 2203, the image file not assigned with the partial NO mark is searched for. In other words, the image is searched for which does not include a partial area that has been determined to be "partial NO" by the user. If a check mark is turned on for a search item 2204, the image file assigned with the partial NO mark is searched for. In other words, the image is searched for which includes a partial area that has been determined to be "partial NO" by the user, regardless of whether the image includes one or more partial areas that have been determined to be "partial OK". If a check mark is turned on for a search item 2205, the image file assigned with only the partial NO mark is searched for. In other words, the image is searched for which includes partial areas that have been all determined to be "partial NO" by the user.

Figure 24:
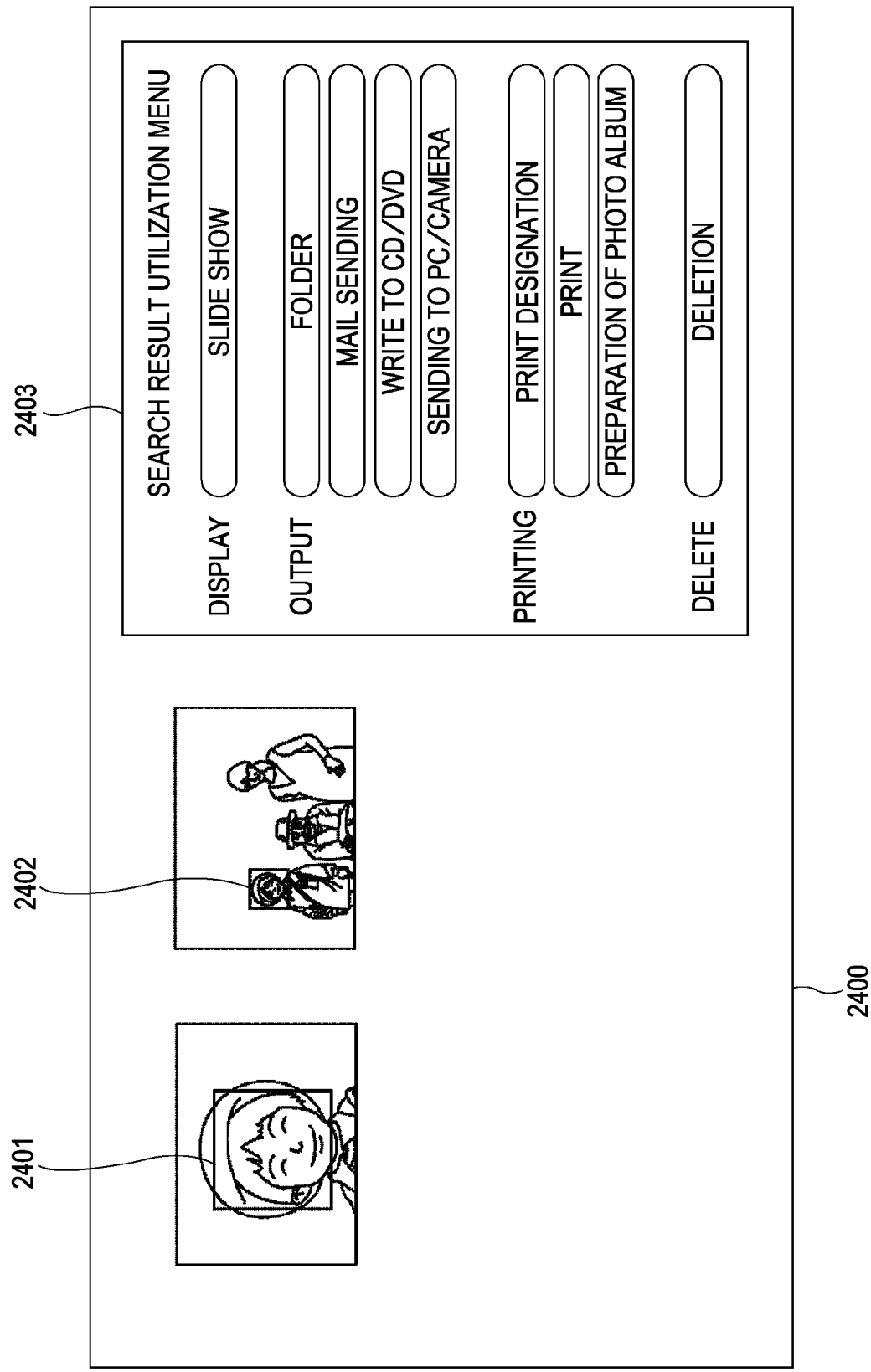
FIG. 24 illustrates an example of a search result list screen displayed on the display screen in the third exemplary embodiment of the present invention.

The search result is displayed on a search result screen 2400 illustrated in the example shown in FIG. 24. Images 2401 and 2402 found by the search are displayed in order depending on the partial OK score or the partial NO score. For example, those images are displayed in the descending order of the partial OK score or the partial NO score. Further, a search result utilization menu 2403 allowing the user to designate the type of processing, which is to be performed using the image file found by the search, is displayed as illustrated in the example shown in FIG. 24. The utilization menu 2403 may include one or more of a slide show function for displaying the images in sequence, a folder output function for enabling the images to be stored together in a predetermined folder, and a mail sending function for sending the image file as an attachment to mail message, such as an E-mail message. Further, the utilization menu 2403 can include one or more of a CD/DVD write function for outputting the image file to the data output device 111 for writing to a CD/DVD drive, and a PC/camera sending function for sending the image file to a PC or another digital camera. In addition, the utilization menu 2403 can include one or more of a print designation function for recording DPOF information to designate the image file as a printing target, and a print function for printing the image file by a printer connected to the digital camera 100. Another example of the menu item may be a photo album preparing function for preparing an electronic album of images and printing the images. Still other examples can include one or more of a delete function for deleting the image file, and a function for assigning, to the image file, a keyword corresponding to the designated search condition. With the last function, for example, the image file found through the search when the check mark for the search item 2202 is turned on can be stored while a keyword of "succeeded image" is assigned to the relevant image file.

Thus, the digital camera 100 may be able to, for example, successively reproduce the image files with the slide show function, which have been found through the search when the check mark is turned on, for example, for the search item 2202, or to send the image file with the mail sending function, which has been found through the search when the check mark is turned on for example, for the search item 2203. Further, when the check mark is turned on for example for the search item 2202, one or more image files having the OK scores higher than a predetermined value can be selected and reproduced with the slide show function or sent as a mail message with the mail sending function.

In the digital camera 100, the user can delete one or more image files which have been found through the search when the check mark is turned on for example, for the search item 2204 or the search item 2205. Stated another way, the user can utilize the mark information, which has been partially added as a result of the user's determination as to whether the photographing has succeeded or failed, to extract one or more images for displaying, storing and/or printing the extracted images. Further, the user can delete the images together, which have been determined to have apparently failed. Moreover, when the check mark is turned on for example for the search item 2204 or the search item 2205, one or more image files having the NO scores higher than a predetermined value can be selected and deleted.

Figure 25:
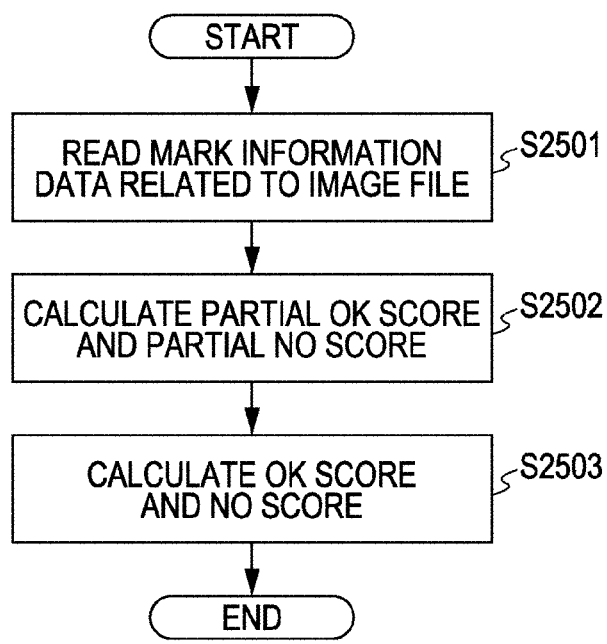
FIG. 25 is a flowchart illustrating an example of the operation of calculating a score of an image file in the third exemplary embodiment of the present invention.

An example of an operation of, when the mark information is recorded with respect to the image file, calculating the OK/NO score in the digital camera 100 will be described below with reference to a flowchart shown in the example of FIG. 25. Because the partial areas of images may have different sizes (e.g., areas) from one another, the image file may not be able to be adequately rated (e.g., evaluated) based only on the numbers of the partial OK areas and/or the partial NO areas. For that reason, the image file may be rated according to this third exemplary embodiment, taking into account the size of each partial area with respect to the entire image.

In step S2501, the image data analyzing device 401 reads the mark information data assigned to the image file. In step S2502, the OK/NO score calculating device 407 calculates the partial OK score or the partial NO score of each partial area in accordance with the mark information data having been read in step S2501 and an OK/NO coefficient table illustrated in the example shown in FIG. 26. As illustrated in the example shown in FIG. 26, an OK coefficient 2603 and a NO coefficient 2604 are preset for each mark type 2601 and each mark level 2602. The partial OK score of each partial area can be calculated by multiplying a size rate of the partial area by the OK coefficient. The partial NO score of each partial area can be calculated by multiplying a size rate of the partial area by the NO coefficient. Taking, as an example, mark information data 1604 for an area ID "Area_1" in FIG. 16, the partial OK score is calculated as follows. First, the size of the partial area is calculated from the area position 1602. Then, a size rate is obtained from the calculated size of the partial area and the preset size (e.g., area) of the entire image.

It is here assumed that the size rate is obtained as 20. Because the mark information (e.g., type) 1603 is "OK" and the mark level 1605 is "3", "1.3" is obtained as the OK coefficient by referring to the OK/NO coefficient table of the example shown in FIG. 26. Accordingly, the partial OK score of the partial area "Area_1" is obtained as "20×1.3=26". The partial NO score is "0". The partial OK score or the partial NO score calculated for each partial area is stored in a partial-area OK/NO score management table 2700, illustrated in the example shown in FIG. 27, which is prepared in the image DB 408. More specifically, a partial OK score 2705 and a partial NO score 2706 are recorded for each partial area ID 2702. The partial OK score 2705 and the partial NO score 2706 of each partial area are stored in relation to an image ID 2701. A size rate 2703 and a mark type 2704 are also included in the partial-area OK/NO score management table 2700. Further, in step S2503, the OK/NO score calculating device 407 calculates the OK score or the NO score for each image file. The calculated OK score and NO score of each image may be stored as one set of data 2804 in an image OK/NO score management table 2800, as illustrated in the example shown in FIG. 28, which is prepared in the image DB 408. In the image OK/NO score management table 2800, an OK score 2802 for each image file is the sum of the partial OK scores recorded in relation to an image ID 2801 of the relevant image file, and a NO score 2803 for each image file is the sum of the partial NO scores recorded in relation to the image ID 2801 of the relevant image file.

As described above, for each image file, the partial OK score, the partial NO score, the OK score, and the NO score can be recorded and managed. Further, rating of each image file, such as success in photographing or failure in photographing, can be performed based on those scores.

Figure 29:
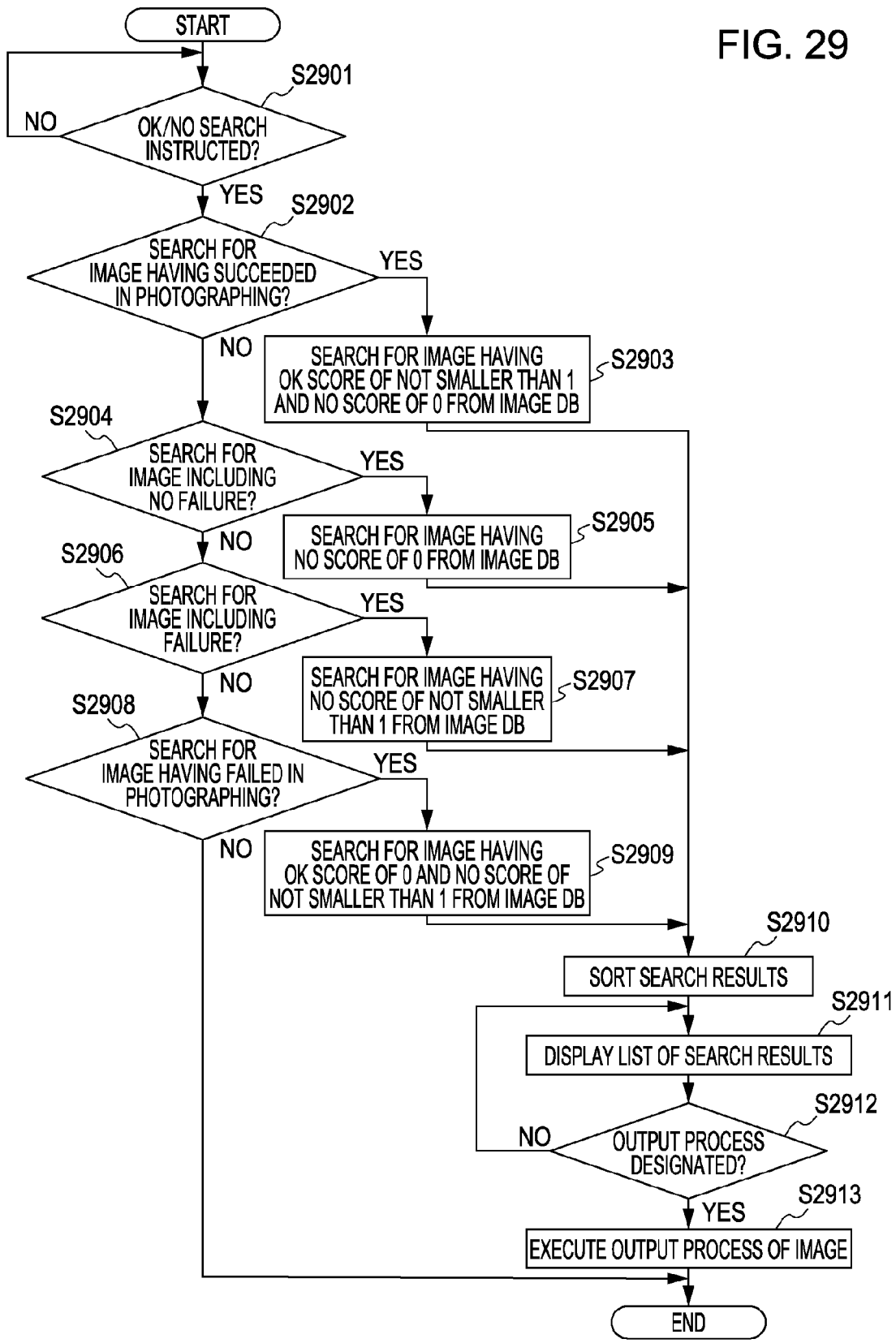
FIG. 29 is a flowchart illustrating an example of the operation of searching for an image file in the third exemplary embodiment of the present invention.

An example of a processing flow for a search executed in the digital camera 100 by using the OK/NG mark information will be described below with reference to the flowchart of FIG. 29.

In step S2901, the search condition designating device 409 detects whether the search condition has been designated and the "start search" button 2206 has been pressed on the search condition designating screen (menu) of FIG. 22. If the search has been instructed (YES in step S2901), then processing proceeds to step S2902, whereas if the search has not been instructed (NO in step S2901), then step S2901 is repeated. In step S2902, the search condition designating device 409 determines whether a search (2202) for the image having succeeded in photographing has been designated as the search condition. If the search (2202) is designated (YES in step S2902), the processing flow shifts to step S2903, and if the search (2202) is not designated (NO in step S2902), the processing flow shifts to step S2904. In step S2903, the search device 410 refers to the OK/NO score management table 2800 in the image DB 408 and searches for the image ID having the OK score of not smaller than "1" and the NO score of "0". Once the search is completed, the processing flow shifts to step S2910. In the case of the OK/NO score management table 2800 of the example shown in FIG. 28, an image ID "img0210" is extracted as the search result. In step S2904, the search condition designating device 409 determines whether a search (2203) for the image including no partial area, which has failed in photographing, has been designated as the search condition. If the search (2203) is designated (YES in step S2904), the processing flow shifts to step S2905, and if the search (2203) is not designated (NO in step S2904), the processing flow shifts to step S2906. In step S2905, the search device 410 refers to the OK/NO score management table 2800 in the image DB 408 and searches for the image ID having the NO score of "0". Once the search is completed, the processing flow shifts to step S2910. In the case of the OK/NO score management table 2800 shown in the example of FIG. 28, image IDs "img0210" and "img0230" are extracted as the search result. In step S2906, the search condition designating device 409 determines whether a search (2204) for the image including a partial area, which has failed in photographing, has been designated as the search condition. If the search (2204) is designated (YES in step S2906), the processing flow shifts to step S2907, and if the search (2204) is not designated (NO in step S2906), the processing flow shifts to step S2908. In step S2907, the search device 410 refers to the OK/NO score management table 2800 in the image DB 408 and searches for the image ID having the NO score of not smaller than "1". If the search is completed, the processing flow shifts to step S2910. In the case of the OK/NO score management table 2800 as shown in the example of FIG. 28, the image ID "img0201" and an image ID "img0220" are extracted as the search result. In step S2908, the search condition designating device 409 determines whether a search (2205) for the image having failed in photographing has been designated as the search condition. If the search (2205) is designated (YES in step S2908), the processing flow shifts to step S2909, and if the search (2205) is not designated (NO in step S2908), this processing is brought to an end. In step S2909, the search device 410 refers to the OK/NO score management table 2800 in the image DB 408 and searches for the image ID having the OK score of "0" and the NO score of not smaller than "1". Once the search is completed, the processing flow shifts to step S2910. In the case of the OK/NO score management table 2800 in the example of FIG. 28, the image ID "img0220" is extracted as the search result. In step S2910, the control device 406 obtains a thumbnail image of the image file corresponding to each image ID obtained as the search result, and prepares a search result list in which the OK store, the NO store, the image ID, etc. are listed in sequence. In step S2911, the control device 406 displays the search result list on the display device 107, as illustrated in the example shown in FIG. 24. In step S2912, the control device 406 detects whether any of the various output functions displayed in the utilization menu 2403 has been designated. If the designation of any of the various output functions is detected (YES in step S2912), the processing flow shifts to step S2913. If no designation has been made (NO in step S2912), the processing returns to step S2911. In step S2913, the output process designated in step S2912 is executed on the image file corresponding to the image ID obtained as the search result. Processing may then be ended As described above, the user can instruct operations to search for an image file having a photographing result and to execute an output process. Therefore, a work burden imposed on the user in searching for and selecting the image file can be reduced.

The third exemplary embodiment has been described above in connection with the case of searching for the image file, instructing the output process, and executing the output process for the image file found through the search. However, the procedure is not limited to that case, and can also be modified so as to automatically search for the image file when the output process is instructed, and to execute the instructed output process for the image file found through the search. For example, when the printing process is instructed for a plurality of image files, the image files may be automatically searched for on the condition of the search item 2202, and the printing process may be executed for the image files found through the search. Alternatively, when a deletion process is instructed for a plurality of image files, the image files may be automatically searched for on the condition of the search item 2205, and the deletion process may be executed for the image files found through the search. In those modified cases, it is assumed that the search item is preset in relation to each output process.

Figure 23:
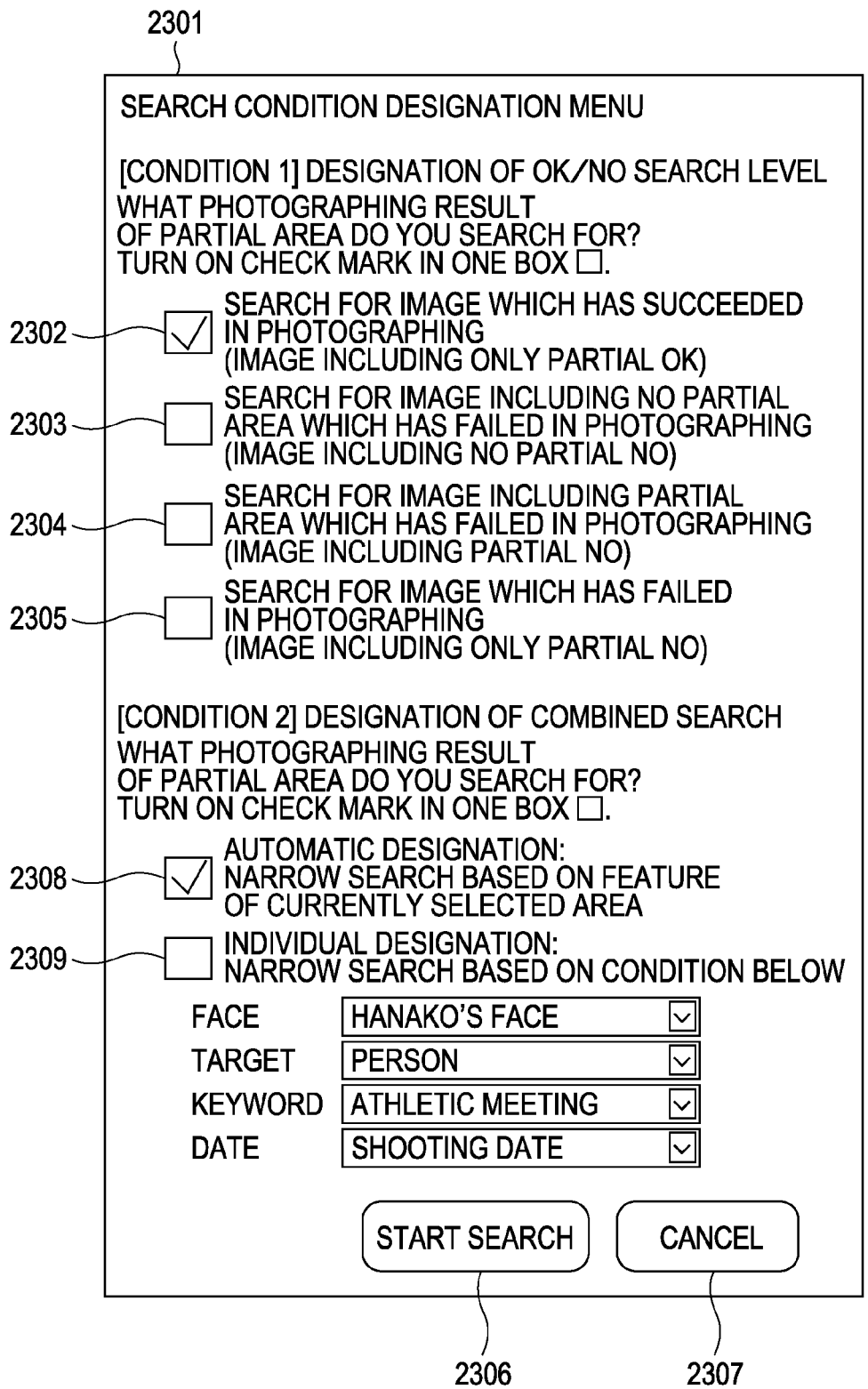
FIG. 23 illustrates another example of the search-condition designation menu screen displayed on the display screen in the third exemplary embodiment of the present invention.

Further, the image file can be searched for by adding one or more other condition to the mark information data. For example, a search for an image file of a particular person, which has succeeded in photographing, can be realized by using the condition of the presence or absence of the partial OK mark and information regarding the face feature of the particular person. In such a case, the search conditions are input in accordance with, e.g., a search condition designation screen (menu) 2301 illustrated in the example shown in FIG. 23. When the user presses the menu button 203 in the state that an image (i.e., one image) is displayed on the display screen 201 of the digital camera 100 or in the state that one of plural images displayed as illustrated in FIG. 21 is selected, the search condition designation screen 2301 may be displayed on the display screen 201. The search condition designation screen 2301 includes search items of [Condition 2] as shown in FIG. 23 in addition to search items 2302 to 2305 which are the same as those of [Condition 1] in the search condition designation screen of FIG. 22. [Condition 2] is provided to designate a combined search condition. Reference numeral 2308 denotes a designation item to automatically designate the search condition. Reference numeral 2309 denotes individual designation items to search for an image under an AND condition using information in, for example, at least one of the face DB, information in the image feature information DB, keyword information, etc. which are stored in the image feature DB, in addition to the OK/NO search condition set as [Condition 1]. The individual designation items 2309 may allow the user to designate a condition for each of individual search items, such as for example at least one of a face, a target, a keyword, and a date. A pull-down menu for the "face" in the individual designation items 2309 includes a list of face images registered in advance such that the user can select the a face from among the list of the face images. On that occasion, it may also be possible to simply designate that an image include, for example, a face in general, or a smiling face, etc., without specifying the particular person. A pull-down menu for the "target" includes a list of tags registered in advance such that the user can select a tag from among the list of the tags. For example, the tags may be automatically assigned to the image file depending on each photographing mode, such as a night scene mode or a portrait mode. A pull-down menu for the "keyword" displays a list of keywords registered in advance such that the user can select a keyword from among the list of the keywords. In an entry column of "date", the user can input a date or period. The setting of the OK/NO search level based on [Condition 1] and the combined search designation based on [Condition 2] may be performed in such a manner. Upon a "start search" button 2306 being pressed, the digital camera 100 may operate so as to search for the image file satisfying the AND condition of [Condition 1] and [Condition 2], and to execute display control so that the search result is displayed on the display device 107 as illustrated in the example shown in FIG. 24. Reference numeral 2307 denotes a "cancel" button.

As described above, since the user can search for one image at a time, which satisfies plural conditions such as for example including a particular person, having a particular date, and having succeeded or failed in photographing, the convenience for the user in terms of manipulating the digital camera may be improved.

In addition, the image files having been found through the search based on [Condition 1] and [Condition 2], as described above, can be further classified based on the condition designated with respect to [Condition 2]. For example, image files may be first found through search based on [Condition 1] and [Condition 2] to obtain the search results, and those image files may then be classified for each of persons designated based on [Condition 2]. The search results can be displayed in accordance with the classification per person.

Thus, the user can hold the rating result regarding the partial area of the image with simple manipulations and can manage the image by utilizing the rating result. Further, the user may be able to more easily confirm the search results and can make the search results subject to the output process per classified group. For example, the user may be able to more simply print images together, which have succeeded in photographing, and delete images together, which have failed in photographing, at a later date.

A fourth exemplary embodiment will be described in connection with the case where a rating (i.e., evaluation result) is set for the partial area of the image, the partial area including a face, in the digital camera 100. Note that a description of components similar to those in the foregoing exemplary embodiments is not repeated here.

When the power button 301 of the digital camera 100 is pressed and the mode selection switch 205 is turned to the reproducing mode, an image having the latest shooting date/time is displayed on the display panel (screen) 201. When the menu button 203 is further pressed, an initial menu screen for the reproducing mode is displayed. All images stored in the storage memory 110 can become target images to be displayed on the display panel 201. However, according to this embodiment, only images satisfying a predetermined condition can be extracted and displayed. For example, the user can move an item on the initial menu screen by pressing the cross-arrow key 202, thus instructing partial rating setting of an image. Further, the user can narrow the types of images, which are to be displayed on the display panel 201, by selecting an "extraction" function. In such a case, the display panel 201 indicates the state that the "extraction" function is selected. Upon the set button 204 being pressed in that state, the displayed screen is changed to a screen for setting a condition for the "extraction" function. If the user wants to change the extraction condition, the user can select a setting value by pressing the leftward key 206 or the rightward key 208 and can determine the selected setting value after update of the existing value by pressing the set button 204. Examples of the setting value for the extraction condition include "all", "all faces", and "particular face".

Figure 30:
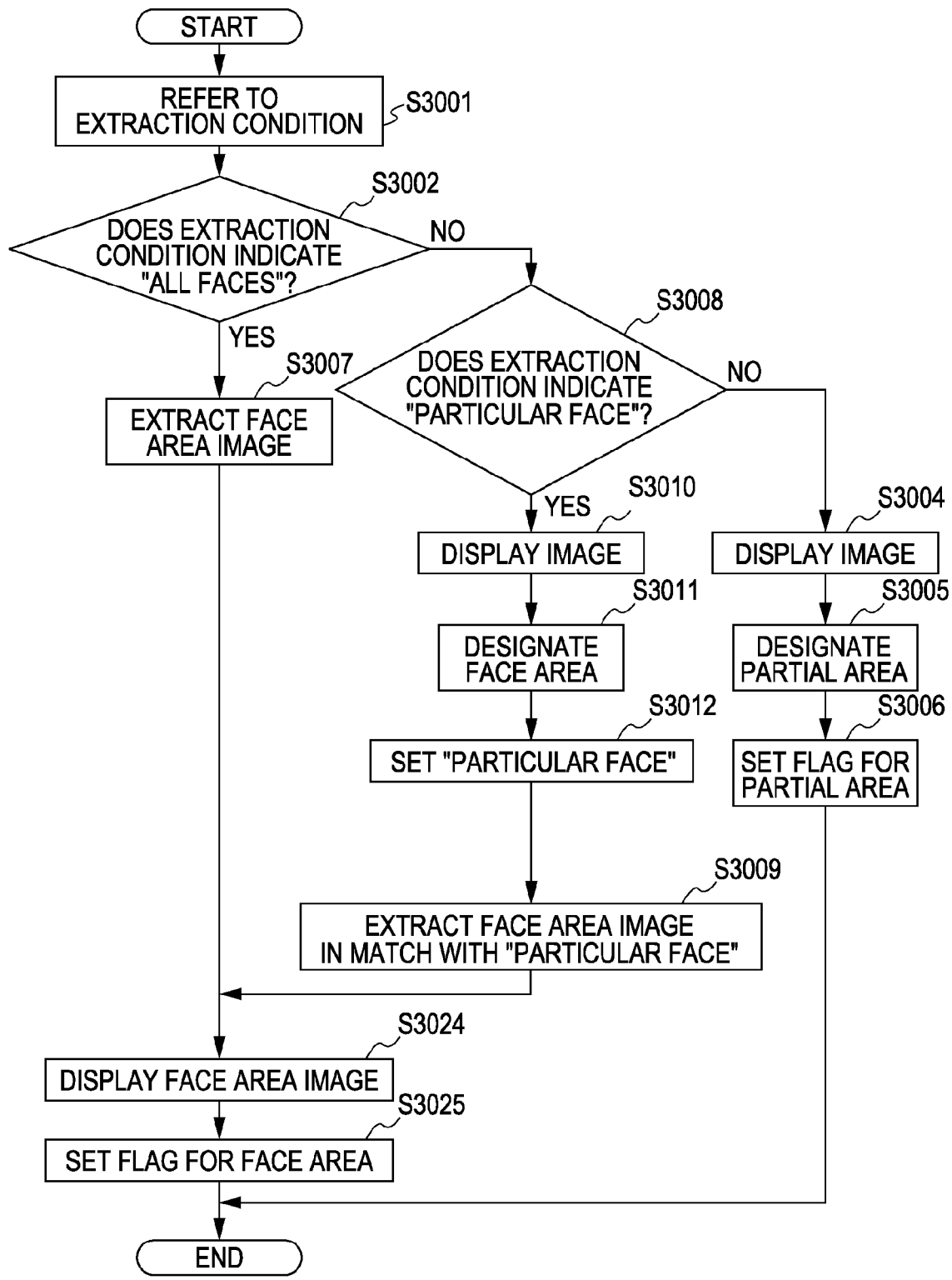
FIG. 30 is a flowchart illustrating an example of the operations executed by the digital camera in a fourth exemplary embodiment of the present invention.

An example of procedures for, in the digital camera 100 according to this exemplary embodiment, optionally setting a flag, which represents a rating (i.e., evaluation result) such as OK (first rating) and NO (second rating), with respect to a face area of an image, and recording the rating in relation to an image file, will be described below with reference to a flowchart shown in the example of FIG. 30. The operation illustrated in the flowchart of FIG. 30 is started when a condition for the "extraction" function is input on the menu screen, which is displayed on the display panel 201, in response to a user's manipulation.

In step S3001, the CPU 109 refers to the setting value of the extraction condition, which has been set with the "extraction" function. In step S3002, the CPU 109 determines whether the setting value referred to in step S3001 indicates "all faces".

Figure 31:
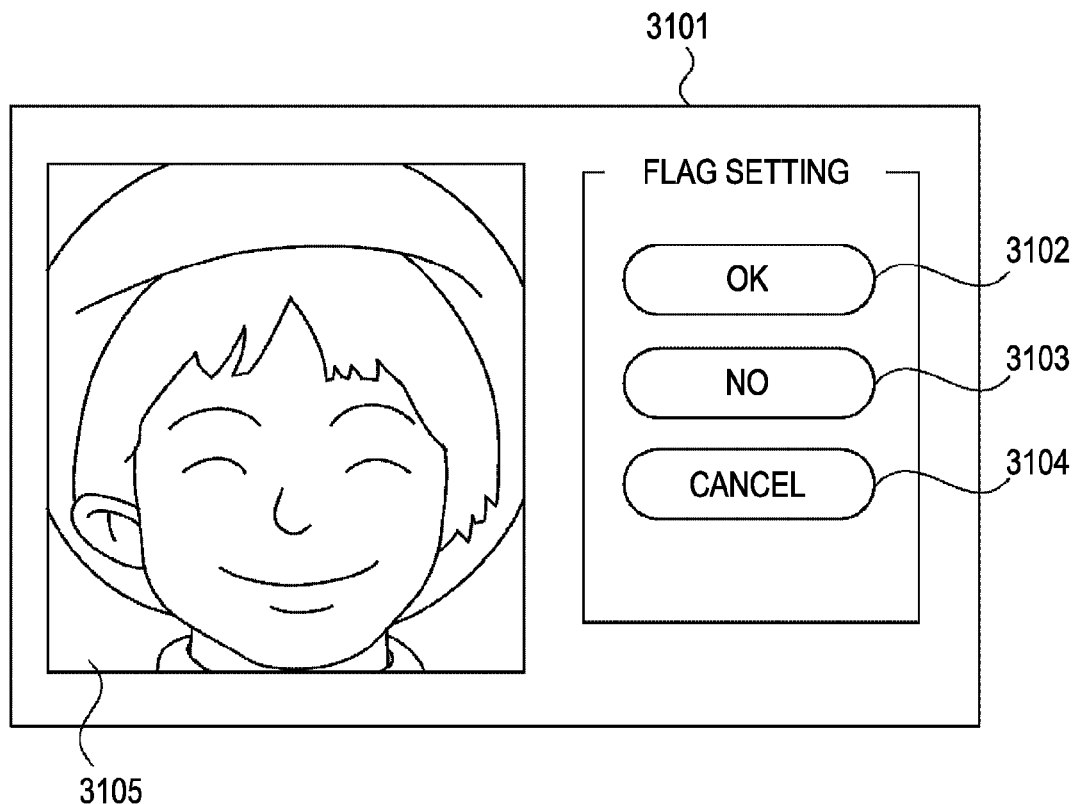
FIG. 31 illustrates an example of a flag setting user interface in the fourth exemplary embodiment of the present invention.

If it is determined in step S3002 that the setting value indicates "all faces" (YES in step S3002), processing proceeds to step S3007, where the CPU 109 executes a face recognition process for the images, which are stored in the storage memory 110, to extract a face area image from an image containing a face. As disclosed in Japanese Patent Laid-Open No. 2004-317699, a face area included in an image may be recognized by executing pattern matching based on pattern information regarding eyes, a nose and a mouth, or by detecting skin color pixels in the image. Processing then advances to step S3024, where the CPU 109 displays the face area image, which has been extracted in step S3007, in an image display area of the display panel 201. By displaying the face area image over the entire image display area, a face portion of the image is displayed in an enlarged size so that the user can more easily confirm details of the face of a photographed person. When one image includes a plurality of face areas, plural face area images may be displayed one by one on the display panel 201, such that the face area images can be successively displayed from one to next in response to the manipulation of the cross-arrow key 202. When a single image includes a plurality of face areas, plural face area images can also be displayed on the image display area at one time by dividing the display screen into plural parts. Processing then proceeds to step S3025, where the CPU 109 sets, in response to a user's input manipulation, a flag for the face area displayed in the image display area. Processing may then be ended. FIG. 31 illustrates an example of a flag setting screen 3101. The user can determine a value of the flag set for the face area, which is displayed in an image display area 3105, by pressing the cross-arrow key 202 to move the cursor to "OK" 3102 or "NO" 3103 and pressing the set button 204. When a single image includes a plurality of face areas, the flag may be set for each of the plural face area images by displaying the face area images in sequence. When the face area image is determined to be neither "OK" nor "NO", the use can designate "Cancel" 3104 to set nothing. The coordinates of each face area and the flag set for the relevant face area are recorded in relation to the image file. At that time, the information regarding the face area and the flag can be stored in a state added to the image file. Alternatively, the information regarding the face area and the flag and the image file can be separately stored while correspondence therebetween is additionally recorded.

If it is determined in step S3002 that the setting value of the extraction condition does not indicate "all faces" (NO in step S3002), processing proceeds to step S3008 where the CPU 109 determines whether the setting value of the extraction condition indicates "particular face". If it is determined in step S3008 that the setting value represents "particular face" (YES in step S3008), processing proceeds to step S3010, where the CPU 109 reads the images, which are stored in the storage memory 110, to display a list of the images on the display panel 201. By displaying the plural images at that time, the user can more quickly recognize an image containing an object face. The CPU 109 may select an image in response to a user's selection manipulation. Further, the CPU 109 may display the selected image on the display panel 201. In step S3011, the CPU 109 executes the face recognition process on the selected image to extract a face area image. If one face area is extracted, that face area is designated. If a plurality of face areas are extracted, one of the plural face areas is designated as a face area, which becomes an extraction target, in response to a user's selection instruction. In step S3012, the CPU 109 analyzes the face area designated in step S3011 and sets feature information of the relevant face area as feature information of the "particular face". Information regarding, e.g., not only the feature information of the face area, which has been set as the "particular face", but also the image of the face area, is stored in the storage memory 110.

Processing then proceeds to step S3009, where the CPU 109 executes the face recognition process on each of the images stored in the storage memory 110 to extract a face area image from the image including a face in match with the feature information of the particular face area which has been stored in the storage memory 110 in step S3012. Thereafter, the CPU 109 executes the same processes as those of steps S3024 and S3025 in sequence.

Furthermore, instead of the above-described processing from step S3010 to step S3012, the face area images having been stored in the storage memory 110 in step S3012 before can be displayed as a list of the face area images on the display panel 201, and one selected from among the displayed face area images can be set as the particular face. In that case, if the image stored in the storage memory 110 is deleted, the information of the face area corresponding to the deleted image can also be deleted from the storage memory 110. This can contribute to avoiding wasteful efforts on the part of the user to set the extraction condition for the image not existing in the storage memory 110, and to more effectively utilize the storage capacity of the storage memory 110.

Figure 32:
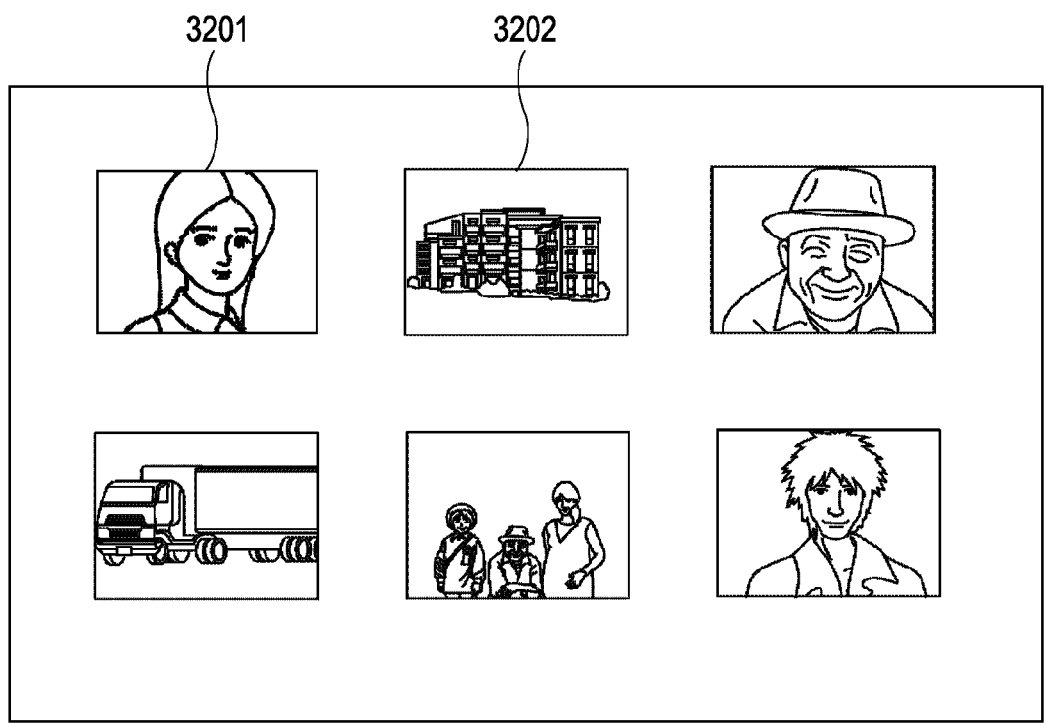
FIG. 32 illustrates an example of image list screen in the fourth exemplary embodiment of the present invention.

If it is determined in step S3008 that the setting value of the extraction condition does not indicate "particular face" (NO in step S3008), processing proceeds to step S3004, and the CPU 109 determines that the setting value of the extraction condition indicates "all", and the CPU 109 reads all the images stored in the storage memory 110. Then, the CPU 109 causes the read images to be displayed on the display panel 201 in sequence. In this exemplary embodiment, the images may be displayed on the display panel 201 in the backward order from the image having the latest shooting date/time. When the multifunction lever 303 or the cross-arrow key 202 is manipulated in the image enlargement direction in the state that one image is displayed on the display panel 201, a particular partial area included in the image may be displayed in the image display area of the display panel 201 in an enlarged scale. For example, when the user manipulates the multifunction lever 303 once so as to pull (rotate) the lever clockwise, the partial area of the image may be displayed in an enlarged scale in response to the manipulation. A center of the partial area of the image displayed in the enlarged scale may be the same as that of the image before the enlargement, and an enlargement rate is provided as a preset fixed value. When the user further manipulates the multifunction lever 303 so as to pull (rotate) the lever clockwise, the partial area of the image is further responsively displayed in accordance with the certain enlargement rate, and the enlarged partial area of the image may be displayed on the display panel 201. Also, when the cross-arrow key 202 is pressed in the state that the enlarged partial area of the image is displayed on the display panel 201, the partial area of the image displayed on the display panel 201 may be moved through a distance corresponding to a grid interval value, which is set as a fixed value, in response to the pressing. On the other hand, when the user manipulates the multifunction lever 303 once so as to pull (rotate) the lever counterclockwise, the image size may be reduced in response to the manipulation for changing over to display of plural images. The number of images displayed at that time can be preset as a fixed value. FIG. 32 displays an example of a state where a plurality of images are displayed on such an occasion. More specifically, an image 3201 including a face and an image 3202 including no face are displayed on the display panel 201 in a mixed way. The multifunction lever 303 is designed according to a mechanism such that, after the multifunction lever 303 has been pulled (or rotated), the lever is forced to automatically return to an original position by itself. Therefore, the manipulation of pulling the multifunction lever 303 can be repeated. By manipulating the multifunction lever 303 and the cross-arrow key 202 as described above, the display size and the display position of the image displayed in the image display area can be changed.

In step S3005, the CPU 109 designates, as the partial area of the image, the display range of the image displayed in the image display area as described above. In this exemplary embodiment, upon detecting the manipulation of pressing the set button 204, the CPU 109 obtains the coordinates of the display range of the image displayed in the image display area and designates that display range of the image as the partial area of the image. In step S3006, the CPU 109 sets a flag for the partial area, which has been designated in step S3005, in response to a user's input manipulation. It is also possible to designate a plurality of partial areas for one image and to set a flag for each of the plural partial areas. Further, the coordinates of each partial area and the flag set for the relevant partial area are recorded in relation to the image file. At that time, the information regarding the partial area and the flag can be stored in a state added to the image file. Alternatively, the information regarding the partial area and the flag and the image file can be separately stored while correspondence therebetween is additionally recorded. Processing may then be ended The above description is made in connection with the case of employing the face area, which has been extracted in step S3007 or step S3009, as a target of the flag setting. However, a flat setting target area can also be a partial area designated for the extracted face area in a similar manner to that in step S3005 such that the partial area becomes a target area for the flag setting.

Figure 33:
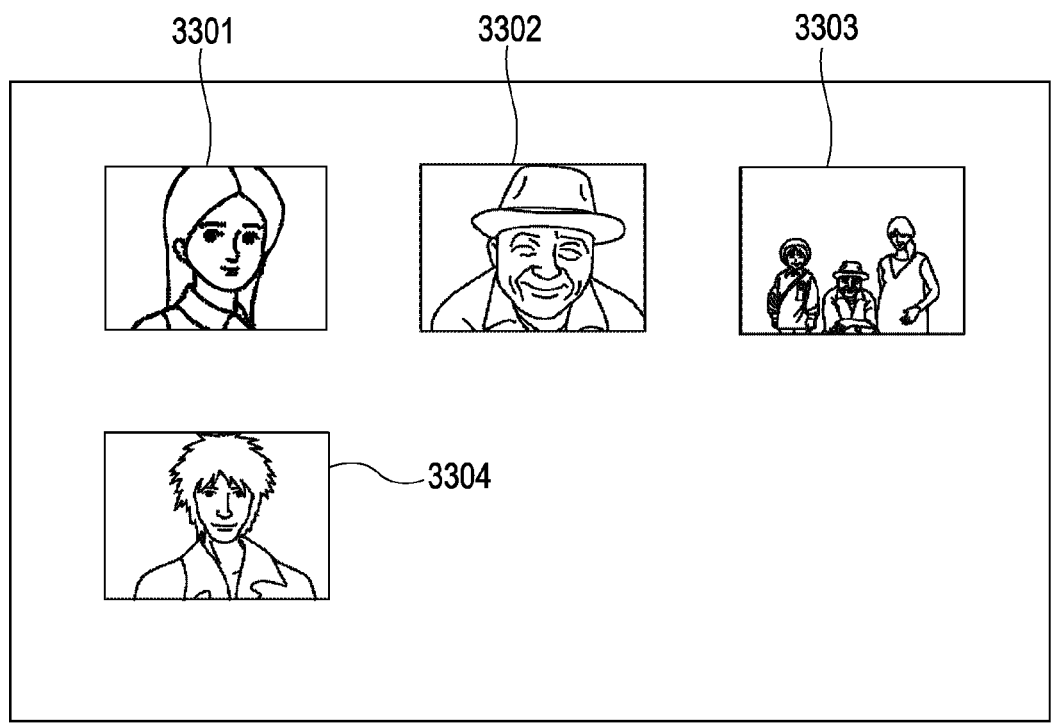
FIG. 33 illustrates another example of an image list screen in the fourth exemplary embodiment of the present invention.

Further, the above description is made in connection with the case of extracting the face area from the image in step S3007 or step S3009 and displaying the face area image in the image display area. However, the procedure is not limited to that case. As another example, the whole of the image for which the extraction of a face area has succeeded in step S3007 or step S3009 can be displayed in the image display area and a partial area can be designated for the displayed image in a similar manner to that in step S3005 such that the partial area becomes a target area for the flag setting. With such a modification, the number of the images as the extraction target may be reduced from that in the case of handling "all" images as the extraction target. Therefore, excessive efforts for selecting the images subjected to the flag setting may be substantially eliminated. FIG. 33 illustrates an example in which a plurality of images 3301 to 3304 for which the extraction of a face area has succeeded are displayed on the display panel 201.

Figure 34:
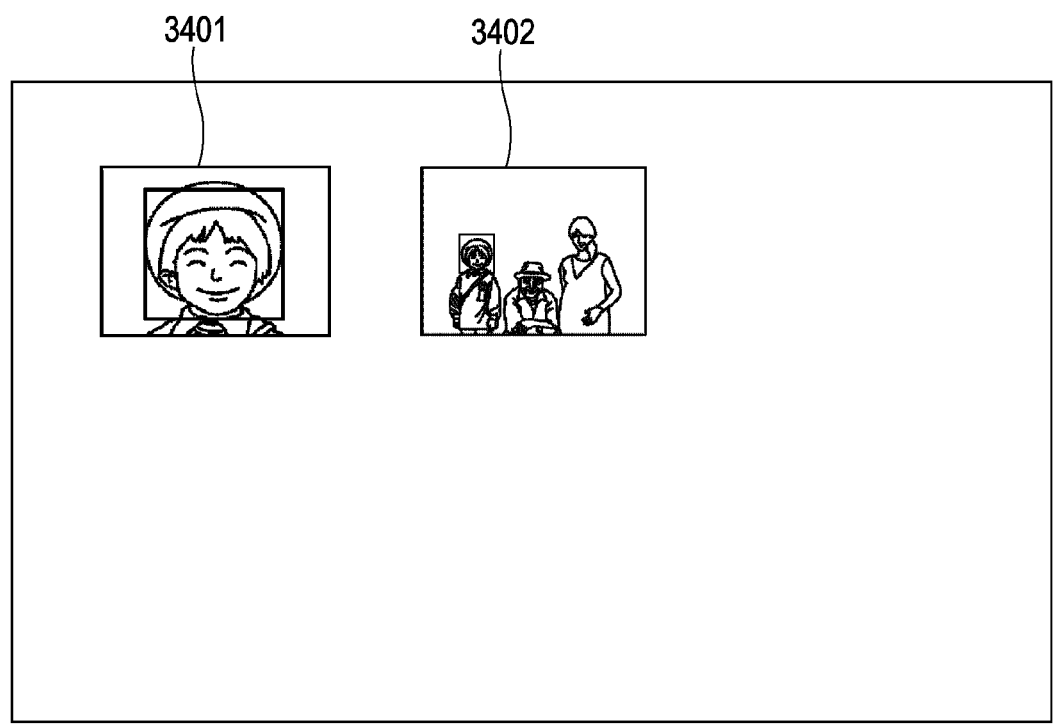
FIG. 34 illustrates still another example of an image list screen in the fourth exemplary embodiment of the present invention.

Still further, the above description is made in connection with the case of displaying only the face area image in the image display area of the display panel 201, which has been extracted in step S3024. However, the procedure is not limited to only that case. As illustrated in the example shown in FIG. 34, the entire image can be displayed in the image display area of the display panel 201 and the face area in the entire image can be displayed in a highlighted manner. In FIG. 34, a face area in each of images 3401 and 3402 is displayed in a highlighted manner by surrounding the face with a frame. The face area surrounded by the frame becomes a target area for the flag setting. Therefore, the user can rate (e.g., evaluate) the face area while confirming the face area in the entire image.

The above description is made in connection with the case of setting the flag in response to the user's input manipulation. However, the procedure is not limited to only that case. For example, the flag can also be automatically set by further detecting, through the face recognition process, whether the face area includes a smiling face, and setting "OK" if the detection result indicates the face area includes a smiling face.

Figure 35:
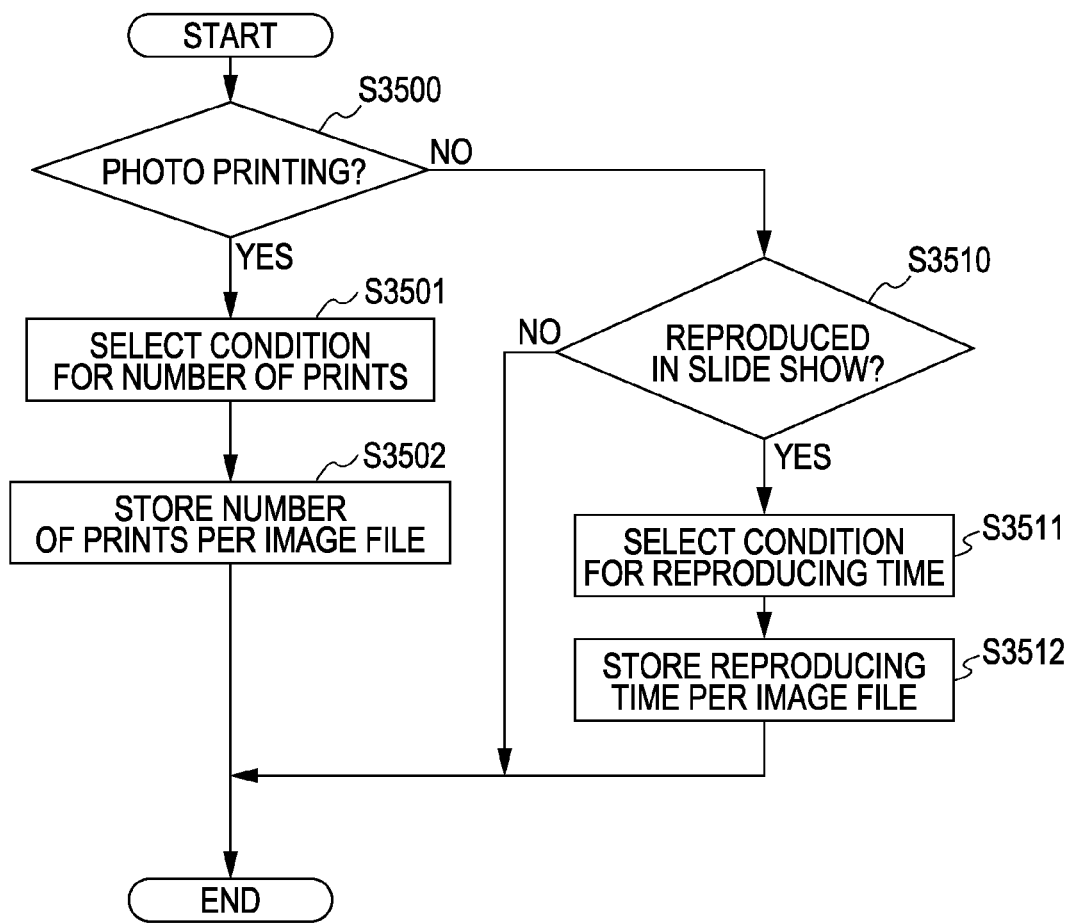
FIG. 35 is a flowchart illustrating an example of the operations executed by the digital camera in the fourth exemplary embodiment of the present invention.

The procedure of outputting an image in the digital camera 100 of this exemplary embodiment, for which a partial rating has been set and held for a person included in the image, will be described below with reference to a flowchart as shown in the example of FIG. 35. The operation of this flowchart may be started when the output process is instructed on a menu screen displayed on the display panel 201 in response to a user's manipulation.

In step S3500, the CPU 109 determines whether the type of the instructed output process represents photo printing. If it is determined in step S3500 that the type of the instructed output process represents photo printing (YES in step S3500), the CPU 109 selects, in step S3501, a condition for the number of prints of photos in response to a user's manipulation. The condition may be set for example by selecting, as the number of prints for each image, one of "number of OKs included in the image" and "number obtained by subtracting the number of NOs from the total number of persons included in the image". In step S3502, the CPU 109 stores the number of prints for each image in the DPOF file in accordance with the condition selected in step S3501. The DPOF file may be stored in the storage memory 110 together with each image file. The DPOF file contains printing designation information corresponding to each image file. The printing designation information includes identification information and the number of prints of the image file that becomes a printing target. The identification information of the image file provides information capable of uniquely identifying each image file stored in the storage memory 110. Specifically, the identification information may be, for example, a file name of the image file. If the condition selected in step S3501 is "number of OKs included in the image", the CPU 109 refers to flags set for each image file and counts the number of flags indicating the OK setting. Further, the CPU 109 determines the count result as the number of prints of the relevant image file and stores the number of prints in the DPOF file. Accordingly, when the number of OKs included in the image file is "0", the number of prints is "0" and the relevant image file is not printed. On the other hand, if the condition selected in step S3501 is "number obtained by subtracting the number of NOs from the total number of persons included in the image", the CPU 109 first executes the face recognition process on each image file to count the total number of persons included in the image. Then, the CPU 109 refers to flags set for each image file and counts the number of flags indicating the NO setting. Further, the CPU 109 determines, as the number of prints of the relevant image file, the result of subtracting the number of the flags indicating the NO setting from the total number of persons included in the image, and then stores the number of prints in the DPOF file.

Thereafter, a printer reads the image file and the DPOF file, which are stored in the storage memory 110 of the digital camera 100, and executes print outputting. Thus, when the user is going to print photos of image files and to distribute the printed photos to persons, the user can print only the satisfactorily taken photos in a suitable number without requiring an excessive amount of effort.

If it is determined in step S3500 that the type of the output process does not represent the photo printing (NO in step S3500), the CPU 109 determines in step S3510 whether the type of the instructed output process represents reproducing in the form of a slide show. If it is determined in step S3510 that the type of the instructed output process represents reproducing in the form of a slide show (YES in step S3510), the CPU 109 selects, in step S3511, a condition for a reproducing time of each image in response to a user's manipulation. If it is determined that reproducing in the form of a slide show has not been instructed as the type of output process (NO in step S3510), then processing may be ended. The condition for the reproducing time may be set by selecting one of "time proportional to the number of OKs included in the image" and "time proportional to the number obtained by subtracting the number of NOs from the total number of persons included in the image". In step S3512, the CPU 109 stores the reproducing time for each image in a slide show management file in accordance with the condition selected in step S3511. The slide show management file is stored in the storage memory 110 together with each image file. The slide show management file contains identification information of the image file that becomes a reproducing target, the sequence in which respective image files are to be reproduced, and the reproducing time of each image file.

If the condition selected in step S3511 is "time proportional to the number of OKs included in the image", the CPU 109 refers to flags set for each image file and counts the number of flags indicating the OK setting. Further, the CPU 109 may determine, as the reproducing time of the relevant image file, the product of a count value and a predetermined reproducing time, and then store the reproducing time of the relevant image file in the slide show management file. The predetermined reproducing time can be optionally set by the user or can be preset as a fixed value specific to the digital camera 100. Accordingly, when the number of OKs included in the image file is "0", the reproducing time is "0" and the relevant image file is not reproduced. On the other hand, if the condition selected in step S3511 is "time proportional to the number obtained by subtracting the number of NOs from the total number of persons included in the image", the CPU 109 first executes the face recognition process on each image file to count the total number of persons included in the image. Next, the CPU 109 refers to flags set for each image file and counts the number of flags indicating the NO setting. Further, the CPU 109 determines, as the reproducing time of the relevant image file, the product obtained by multiplying the value, which results from subtracting the number of the flags indicating the NO setting from the total number of persons included in the image, by the predetermined reproducing time, and then stores the reproducing time of the relevant image file in the slide show management file.

Thereafter, the digital camera 100 operates so as to refer to the slide show management file, to successively read the image files stored in the storage memory 110, and to display the image files on the display device 107 for the set reproducing time. Thus, the user can reproduce the satisfactorily taken images for a longer time without requiring an excessive amount of effort.

The fourth exemplary embodiment has been described in connection with the case of determining an output quantity (such as the number of prints or the reproducing time) depending on the difference between the total number of persons included in the image and the number of NOs and the number of flags indicating the OK setting. However, the procedure is not limited to that case. For example, the number of NO flags and the number of OK flags can be each compared with a predetermined value, and the output quantity can be determined depending on the comparison result. If the number of OK flags is larger than a predetermined value, a predetermined quantity is output, and if not so, nothing is output. If the number of NO flags is larger than a predetermined value, nothing is output, and if not so, a predetermined quantity is output. Alternatively, if the number of OK flags is larger than the number of NO flags, a predetermined quantity may be output.

With the fourth exemplary embodiment, as described above, an image to be handled as a target of the output process, such as print outputting or display outputting, can be more simply selected by employing a partial rating with respect to a person included in the image.

Further, with the fourth exemplary embodiment, the user can more simply determine setting of the output quantity, such as the number of prints in the print outputting or the reproducing time in the display outputting, by employing a partial rating with respect to a person included in the image without requiring an excessive amount of effort.

A fifth exemplary embodiment will be described in connection with the case that trimming setting is executed in the digital camera 100 on an image in accordance with the state of flags each set for a partial area in relation to an image file. Note that a description of components similar to those in the foregoing exemplary embodiments is not repeated here.

The operation of the digital camera 100 for executing the trimming setting on an image according to this exemplary embodiment will be described below with reference to a flowchart shown in the example of FIG. 36. The operation of this flowchart may be started when "automatic trimming" is selected on a menu screen displayed on the display panel 201 and "print size" is designated in response to the user's manipulations. It is herein assumed that the print size is provided, for example, as L-, 2L, A4- and A3-sizes, and has a preset value of the aspect ratio. Accordingly, designation of the print size is equivalent to designation of the aspect ratio.

Figure 37:
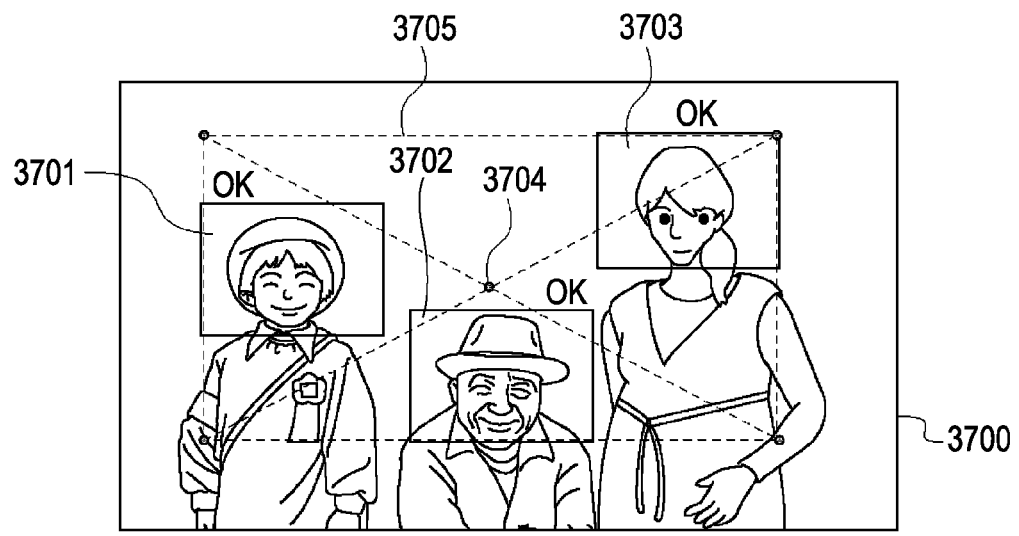
FIG. 37 illustrates an exemplary image displayed in the fifth exemplary embodiment of the present invention.

In step S3600, the CPU 109 determines whether a flag indicating a partial area to be OK (hereinafter referred to as an "OK flag") is attached to an image file. If it is determined in step S3600 that the OK flag is attached (YES in step S3600), the CPU 109 generates, in step S3601, a virtual rectangle including the partial area assigned with the OK flag (hereinafter referred to as an "OK rectangle") and obtains the coordinates of a central position of the OK rectangle. More specifically, as illustrated in the example shown in FIG. 37, when the OK flag is set for each of partial areas 3701, 3702 and 3703 in an image 3700, the CPU 109 generates a virtual rectangle 3705 including all the partial areas 3701, 3702 and 3703 and obtains the coordinates of a central position 3704 of the virtual rectangle 3705. The coordinates of the central position 3704 may be obtained as follows. Respective coordinates of the partial areas 3701, 3702 and 3703 are previously stored in the storage memory 110 as the position information, as described above. A minimum value and a maximum value are obtained from among X- and Y-coordinates of those stored coordinates. Then, coordinates (X0,Y0) of the central position 3704 can be calculated based on the following formulae (1) and (2):

$$X0 = (\text{minimum value of } X\text{-coordinates} + (\text{maximum value of } X\text{-coordinates} - \text{minimum value of } X\text{-coordinates})/2) \quad (1)$$

$$Y0 = (\text{minimum value of } Y\text{-coordinates} + (\text{maximum value of } Y\text{-coordinates} - \text{minimum value of } Y\text{-coordinates})/2) \quad (2)$$

Figure 38:
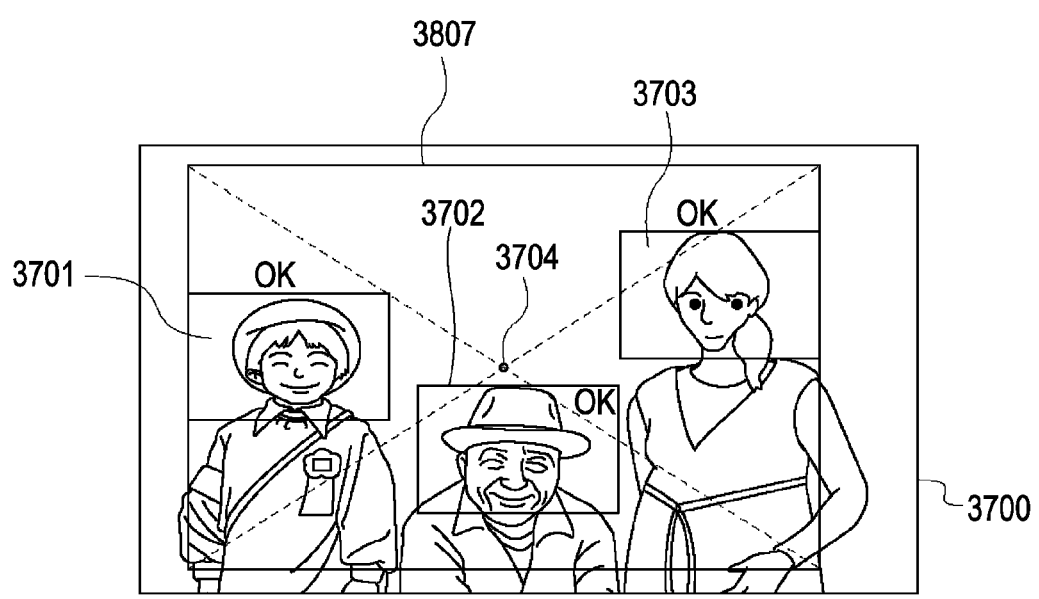
FIG. 38 illustrates an exemplary image displayed in the fifth exemplary embodiment of the present invention.
Figure 41:
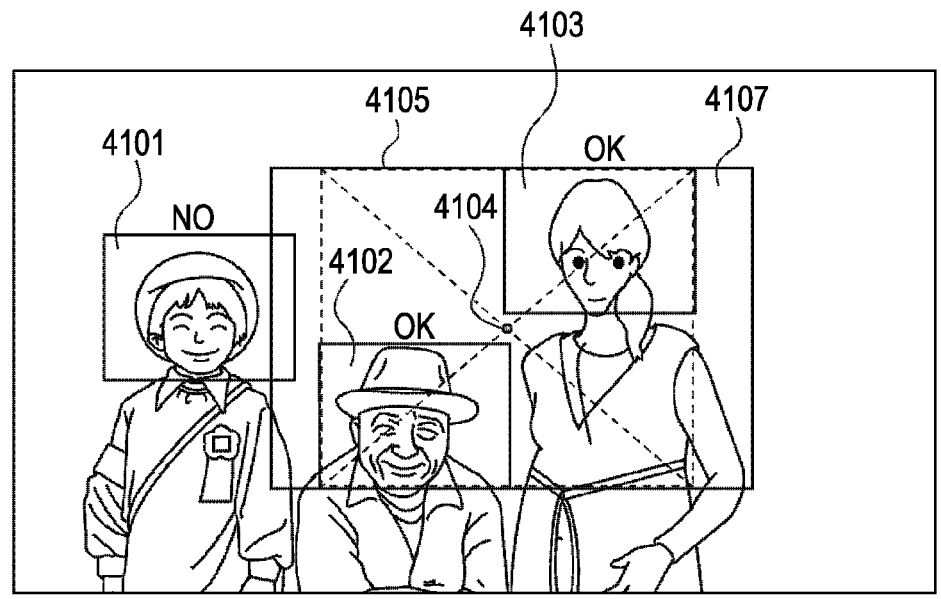
FIG. 41 illustrates an exemplary image displayed in the fifth exemplary embodiment of the present invention.

In step S3612, the CPU 109 determines whether there is a partial area assigned with a flag indicating NO. If it is determined in step S3612 that there is no NO partial area (NO in step S3612), the CPU 109 shifts to step S3604. If it is determined in step S3612 that there is a NO partial area (YES in step S3612), the CPU 109 generates, in step S3602, a virtual rectangle including the NO partial area (hereinafter referred to as an "NO rectangle") and obtains the coordinates of a central position of the NO rectangle. The NO rectangle can be generated by executing a process on the NO partial area in a similar way to that executed in generating the OK rectangle in step S3601. In an image illustrated in the example shown in FIG. 41, because there is only one partial area assigned with the NO flag, a NO rectangle 4101 is provided as an area in match with a NO partial area. Additionally, an OK rectangle 4105 is provided as an area including partial areas 4102 and 4103 which are each assigned with the OK flag. In step S3603, the CPU 109 detects an overlap between the OK rectangle generated in step S3601 and the NG rectangle generated in step S3602. Herein, the overlap therebetween may be detected by comparing the values of respective X-coordinates and Y-coordinates of the OK rectangle and the NG rectangle. If the overlap between the OK rectangle and the NG rectangle is detected in step S3603 (YES in step S3603), the CPU 109 displays a dialog notifying of an alarm on the display panel 201 in step S3609, thereby completing a series of processes. When the series of processes are continuously executed on a plurality of image files, one or more images for which a trimming process has failed to execute can be displayed as a list on the display panel 201, thus prompting the user to make confirmation. If the overlap between the OK rectangle and the NG rectangle is not detected in step S3603 (NO in step S3603), the CPU 109 determines a trimming location in step S3604 and stores the trimming location, as trimming information, in the storage memory 110. For example, as illustrated in the example shown in FIG. 38, a trimming location 3807 is determined such that a central position 3704 of the OK rectangle 3705 matches with a central position of a trimming frame having an aspect ratio designated in advance. Alternatively, as illustrated in FIG. 41, a trimming location 4107 may be determined such that a central position 4104 of an OK rectangle 4105 matches with a central position of a trimming frame having an aspect ratio designated in advance.

Figure 43:
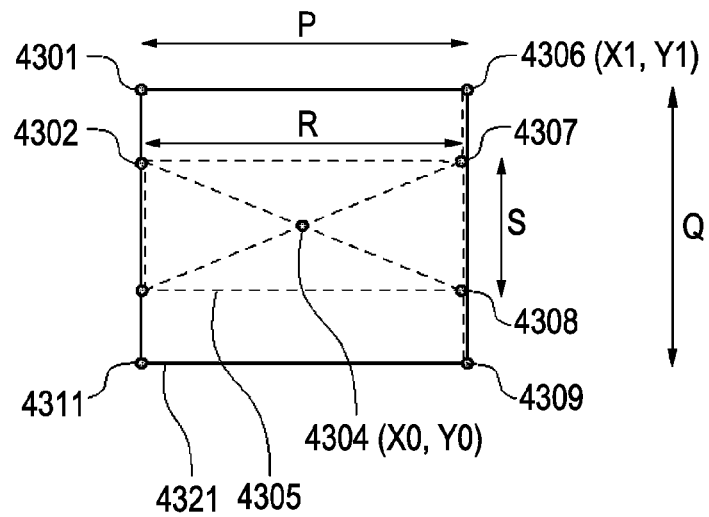
FIG. 43 is an illustration to explain an example of a method of calculating a trimming location in the fifth exemplary embodiment of the present invention.
Figure 44:
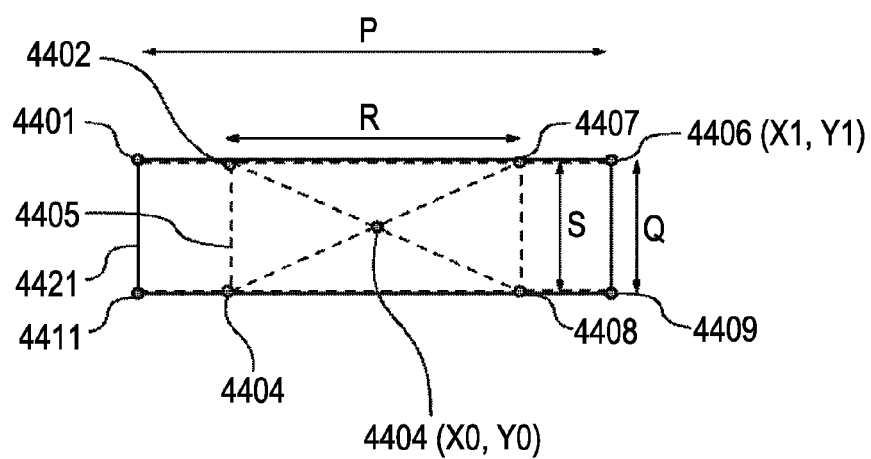
FIG. 44 is an illustration to explain an example of the method of calculating the trimming location in the fifth exemplary embodiment of the present invention.

FIGS. 43 and 44 are illustrations for explaining in detail an example in which the CPU 109 calculates a trimming location in step S3604 based on the central position of the OK rectangle generated in step S3601. First, the case that the trimming frame has a larger vertical length than the virtual rectangle will be described with reference to FIG. 43. When an aspect ratio (=A) preset in correspondence to, e.g., a print size is smaller than the aspect ratio of the OK rectangle, the CPU 109 determines that the trimming frame has a larger vertical length than the virtual rectangle, and obtains a trimming location as follows. In FIG. 43, the trimming frame is indicated by a rectangular area 4321 surrounded by solid lines, and the OK rectangle is indicated by a rectangular area 4305 surrounded by dotted lines. P represents the length of a segment interconnecting an upper left point 4301 and an upper right point 4306 of the trimming frame 4321. Q represents the length of a segment interconnecting the upper right point 4306 and a lower right point 4309 of the trimming frame 4321. R represents the length of a segment interconnecting an upper left point 4302 and an upper right point 4307 of the virtual frame 4305. S represents the length of a segment interconnecting the upper right point 4307 and a lower right point 4308 of the virtual frame 4305. Stated another way, in the case of $1/A \geq S/R$, the CPU 109 determines that the trimming frame 4321 has a larger vertical length than the OK rectangle (virtual rectangle) 4305, and calculates P and Q, which provide the size of the trimming location (frame), based on the following formulae (3) and (4):

$$P = R \tag{3}$$

$$Q = P \times (1/A) = R \times (1/A) \tag{4}$$

Assuming that the coordinates of the upper right point 4306 of the trimming frame 4321 are $(X1,Y1)$ and the coordinates of the central position 4304 of the OK rectangle 4305, calculated as described above, are $(X0,Y0)$, the coordinates $(X1,Y1)$ of the upper right point 4306 of the trimming frame 4321 can be expressed by the following formulae (5) and (6):

$$X1 = X0 + R/2 \tag{5}$$

$$Y1 = Y0 + Q/2 = Y0 + R/2 \times (1/A) \tag{6}$$

Respective coordinates of the upper left point 4301, the lower left point 4311, and the lower right point 4309 of the trimming frame 4321 can also be successively calculated by referring to the values calculated as described above. The trimming location is thus determined.

Next, the case that the trimming frame has a larger horizontal length than the virtual rectangle will be described with reference to FIG. 44. When the aspect ratio (=A) preset in correspondence to, e.g., the print size is equal to or larger than the aspect ratio of the OK rectangle, the CPU 109 determines that the trimming frame has a larger horizontal length than the virtual rectangle, and obtains a trimming location as follows. In FIG. 44, the trimming frame is indicated by a rectangular area 4421 surrounded by solid lines, and the OK rectangle is indicated by a rectangular area 4405 surrounded by dotted lines. P represents the length of a segment interconnecting an upper left point 4401 and an upper right point 4406 of the trimming frame 4421. Q represents the length of a segment interconnecting the upper right point 4406 and a lower right point 4409 of the trimming frame 4421. R represents the length of a segment interconnecting an upper left point 4402 and an upper right point 4407 of the OK rectangle (virtual frame9 4405. S represents the length of a segment interconnecting the upper right point 4407 and a lower right point 4408 of the virtual frame 4405. Stated another way, in the case of $1/A < S/R$, the CPU 109 determines that the trimming frame 4421 has a larger horizontal length than the OK rectangle (virtual rectangle) 4405, and calculates P and Q, which provide the size of the trimming location (frame), based on the following formulae (7) and (8):

$$Q = S \tag{7}$$

$$P = Q \times A = S \times A \tag{8}$$

Assuming that the coordinates of the upper right point 4406 of the trimming frame 4421 are $(X1,Y1)$ and the coordinates of the central position 4404 of the OK rectangle 4405, calculated as described above, are $(X0,Y0)$, the coordinates $(X1,Y1)$ of the upper right point 4406 of the trimming frame 4421 can be expressed by the following formulae (9) and (10):

$$X1 = X0 + P/2 = X0 + S/2 \times A \tag{9}$$

$$Y1 = Y0 + S/2 \tag{10}$$

Respective coordinates of the upper left point 4401, the lower left point 4411, and the lower right point 4409 of the trimming frame 4421 can also be successively calculated by referring to the values calculated as described above. The trimming location is thus determined.

While the above description is made of the case that the virtual rectangle is horizontally elongate as illustrated in FIGS. 43 and 44, the trimming location can also be likewise determined in the case that the virtual rectangle is vertically elongate. Further, while the trimming frame is illustrated as being horizontally elongate, it can also be vertically elongate. As an alternative, the user can optionally make a setting as to whether each of the virtual rectangle and the trimming frame is horizontally or vertically elongate.

While the above description is made of the case that one of a vertical side and a horizontal side of the trimming frame is matched with corresponding one of a vertical side and a horizontal side of the virtual rectangle, a blank can also be left between the trimming frame and the virtual rectangle.

As another modification, the user can optionally select the aspect ratio of the trimming frame. Further, if the trimming cannot be performed at the selected aspect ratio, a prompt can be provided to the user so that the user can make a selection as to whether a change in the aspect ratio is allowed. Alternatively, priority can be set for one of a horizontally long frame or a vertically long frame. In the case of the aspect ratio of 4 to 3 being set with priority given to the horizontally long frame, for example, if trimming cannot be performed on that condition, the trimming may be performed by using a vertically long frame with the aspect ratio of 4 to 3.

Thereafter, in step S3606, the CPU 109 detects whether the trimming location (i.e., frame) determined in step S3604 is overlapped with the NO rectangle 4101 generated in step S3602. Herein, the overlap therebetween is detected by comparing the values of respective X-coordinates and Y-coordinates of the trimming location (frame) and the NO rectangle.

Figure 39:
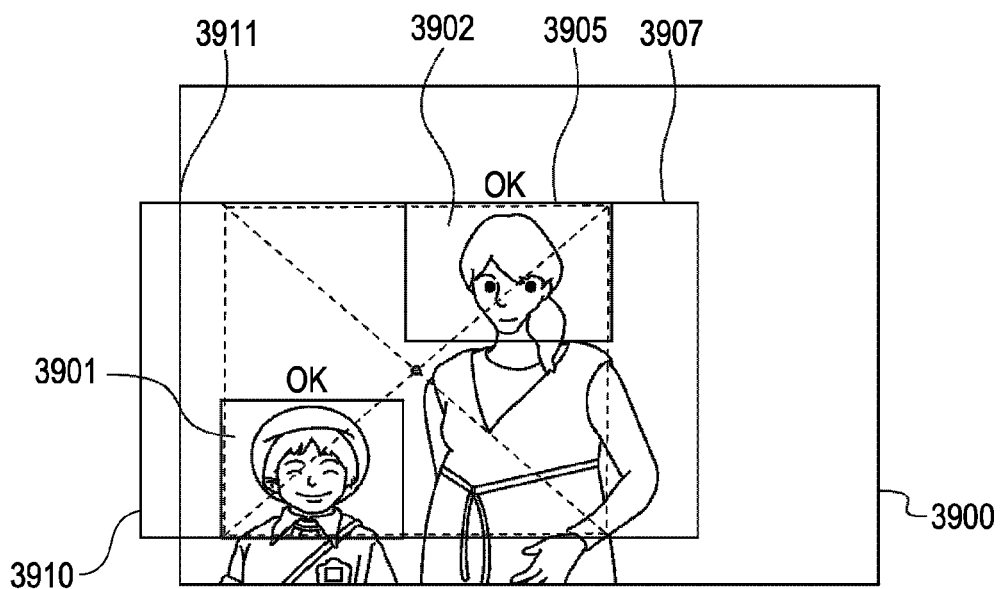
FIG. 39 illustrates an exemplary image displayed in the fifth exemplary embodiment of the present invention.

If the overlap is not detected in step S3606 (NO in step S3606), the CPU 109 determines in step S3608 whether the trimming location is positioned outside the range of the image. FIG. 39 illustrates an example of a state where a partial area 3910 of a trimming location (i.e., frame) 3907 is positioned outside a left end 3911 of the image 3900. Reference numerals 3901 and 3902 denote OK partial areas, and 3905 denotes a virtual rectangle.

If the overlap is detected in step S3606 (YES in step 3603) or if it is determined in step S3608 that the trimming location is not positioned within the range of the image (NO in step S3608), the CPU 109 moves the trimming location in step S3607. At that time, the trimming location is moved in response to a movement instruction which is input according to a user's manipulation. Information of the trimming location is updated depending on the trimming location after being moved and is stored in the storage memory 110. Thereafter, the CPU 109 returns to step S3606.

Figure 40:
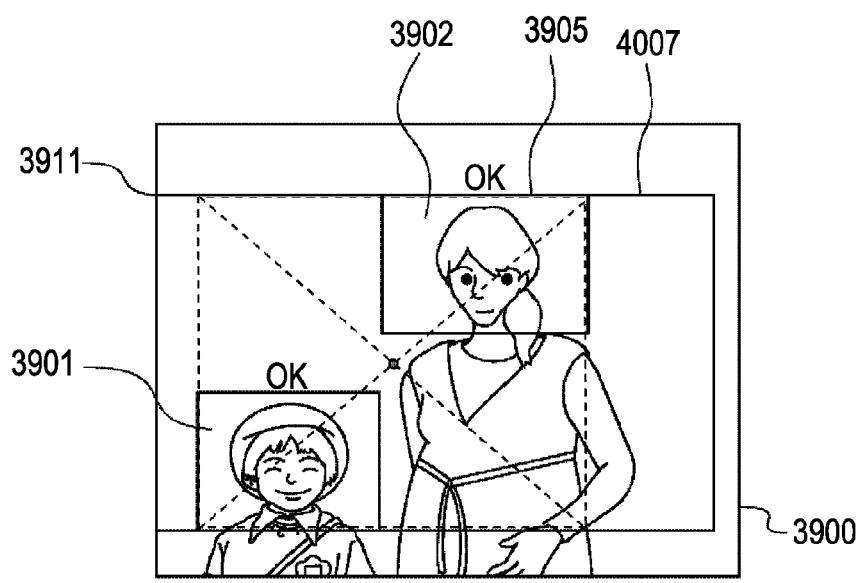
FIG. 40 illustrates an exemplary image displayed in the fifth exemplary embodiment of the present invention.
Figure 42:
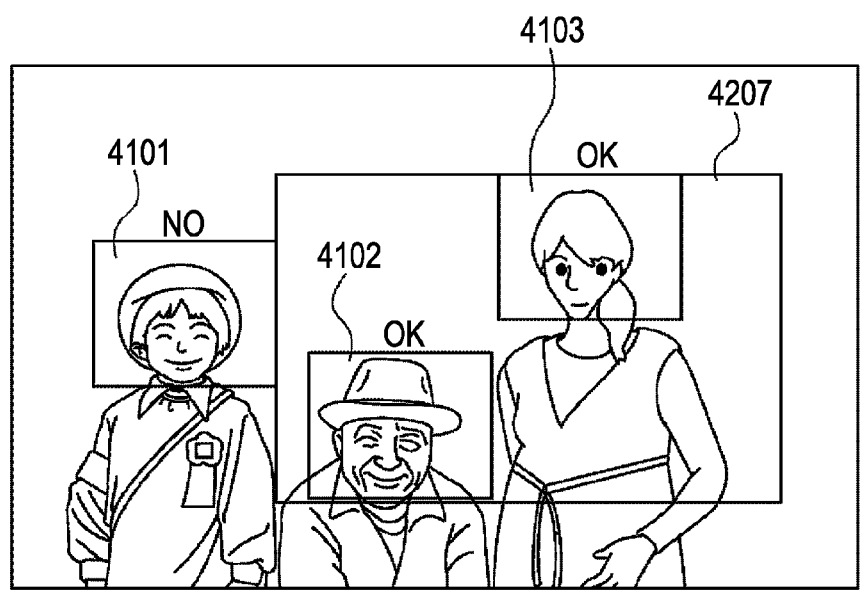
FIG. 42 illustrates an exemplary image displayed in the fifth exemplary embodiment of the present invention.

FIG. 40 illustrates a trimming location 4007 set, for example, by moving the trimming location 3907, which is positioned outside the image 3900 as illustrated in FIG. 39, so as to position within the range of the image 3900. Further, FIG. 42 illustrates a trimming location 4207 set, for example, by moving the trimming location 4107, which is overlapped with the NO rectangle 4101 as illustrated in FIG. 41, so as not to overlap with the NO rectangle 4101.

If it is determined in step S3608 that the trimming location is positioned within the range of the image (YES in step S3608), the CPU 109 brings the above-described series of processes to an end.

If it is determined in step S3600 that there is no OK partial area (NO in step S3600) or in step S3612 that there is no NO partial area (NO in step S3612), the CPU 109 determines the trimming location in step S3604 such that the trimming location (frame) includes no NO partial area and has a maximum size (e.g., area) with a predetermined aspect ratio.

The above-described procedure can be modified so as to count the number of repetitions of the process of moving the trimming location in step S3607, and to bring the series of processes to an end by notifying of an alarm message when the count exceeds a predetermined value.

While the above description is made for the case where the OK rectangle includes all the plural partial areas for which the OK flag has been set, the OK rectangle can also be set so as to include one or more among the plural partial areas each assigned with the OK flag, which may be optionally selected by the user.

While the above description is made for the case where the process of moving the trimming location in step S3607 is executed in response to an instruction from the user, the moving process can also be automatically executed. For example, the CPU 109 can determine the trimming location by changing the coordinates in accordance with preset rules so that the trimming location (i.e., frame) has a predetermined aspect ratio, does not overlap with the NO rectangle, and is positioned within the range of the image. When, for example, a left (or right) end of the trimming location (i.e., frame) overlaps with the NO rectangle, the X-coordinate of a right (or left) end of the NO rectangle is obtained and the X-coordinate of the entire trimming frame is shifted such that the left (or right) end of the trimming location (i.e., frame) is positioned to be not overlapped with the NO rectangle. Alternatively, when, for example, an upper (or lower) end of the trimming location (i.e., frame) overlaps with a lower (or upper) end of the NO rectangle, the Y-coordinate of the lower (or upper) end of the NO rectangle is obtained and the Y-coordinate of the entire trimming location (i.e., frame) is shifted such that the X-coordinate of the upper (or lower) end of the trimming frame is positioned to be not overlapped with the NO rectangle.

The above description is made for the case where the series of processes are brought to an end without executing the trimming process if it is determined in step S3603 that the OK rectangle and the NO rectangle are overlapped with each other. However, if an overlapped area between the OK rectangle and the NO rectangle is smaller than a predetermined value, the CPU 109 can also operate so as to further continue the process of step S3604 without bringing the series of processes to an end.

When the process of moving the trimming location in step S3607 is automatically executed, the moving process can also be executed such that an overlapped area between the trimming location (i.e., frame) and the NO rectangle is held smaller than a predetermined value.

When the overlap between the OK rectangle and the NO rectangle is determined in step S3603 and there are plural partial areas each assigned with the OK flag, the OK rectangle can be generated for each of groups obtained by dividing the OK partial areas into several groups, and several trimming locations (i.e., frames) can be determined so as to avoid an overlap between each of the trimming locations and the NO rectangle. The case of dividing the OK rectangle into plural rectangles will be described below with reference to FIGS. 45 and 46.

Figure 45:
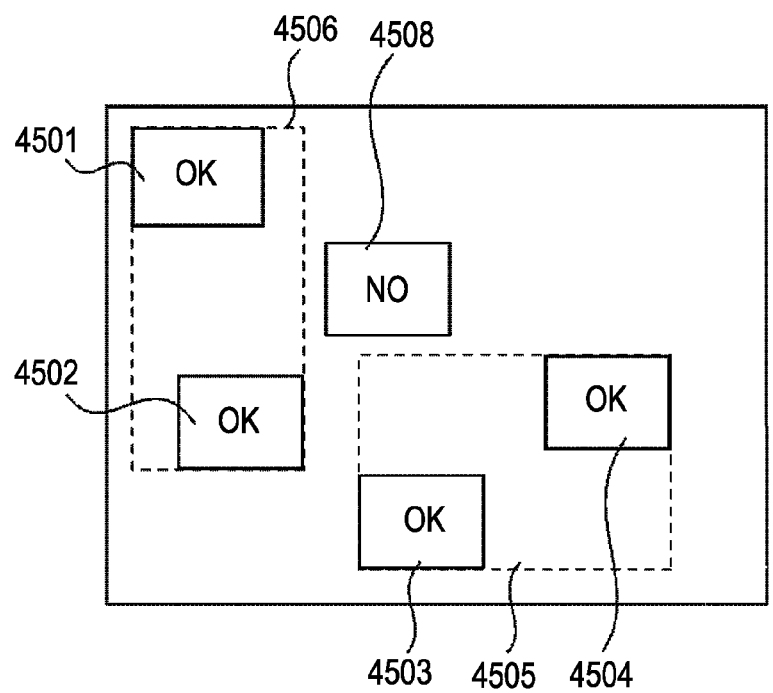
FIG. 45 is an illustration to explain an example of a method of dividing partial regions into groups in the fifth exemplary embodiment of the present invention.
Figure 46:
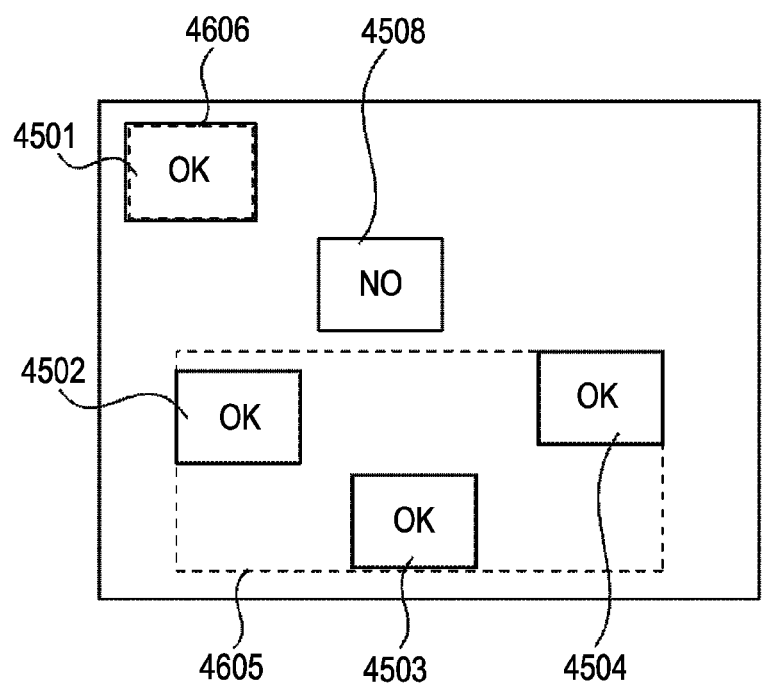
FIG. 46 is an illustration to explain an example of the method of dividing partial regions into groups in the fifth exemplary embodiment of the present invention.

In the example shown in FIG. 45, if an OK rectangle is generated so as to surround all partial areas 4501, 4502, 4503 and 4504 each assigned with the OK flag, the OK rectangle overlaps with a partial area 4509 assigned with the NO flag. As illustrated in FIG. 45, therefore, the CPU 109 generates a plurality of OK rectangles divided such that an OK rectangle 4506 surrounds the partial areas 4501 and 4502, while an OK rectangle 4505 surrounds the partial areas 4503 and 4504. Alternatively, as illustrated in FIG. 46, the CPU 109 generates an OK rectangle 4606 surrounding the partial area 4501 and an OK rectangle 4605 surrounding the partial areas 4502, 4503 and 4504. In the state illustrated in FIG. 45, there are three combinations in dividing the four partial areas into two sets each including two partial areas, i.e., the above-described one combination and other two combinations provided by sets of "4501-4503 and 4502-4504" and sets of "4501-4504 and 4502-4503". However, the combination capable of generating the OK rectangle not overlapping with the NO rectangle 4508 is only the sets of "4501-4502 and 4503-4504" illustrated in FIG. 45. In the state illustrated in FIG. 46, there are four combinations in dividing the four partial areas into two sets one of which includes one partial area and the other of which includes three partial areas, i.e., the above-described one combination and other three combinations provided by sets of "4502, and 4501, 4503 and 4504", sets of "4503, and 4501, 4502 and 4504", and sets of "4504, and 4501, 4502 and 4503". However, the combination capable of generating the OK rectangle not overlapping with the NO rectangle 4508 is only the sets of "4501, and 4502, 4503 and 4504" illustrated in FIG. 46.

Thus, the CPU 109 can obtain OK rectangles corresponding to all combinations of the OK partial areas and can select a proper combination of the OK partial areas to generate an OK rectangle by detecting an overlap of each of the OK rectangles with the NG rectangle.

Further, when there are five partial areas each assigned with the OK flag, the OK rectangle can be divided into an OK rectangle surrounding three partial areas each assigned with the OK flag and an OK rectangle surrounding two partial areas each assigned with the OK flag, or into an OK rectangle surrounding four partial areas each assigned with the OK flag and an OK rectangle surrounding one partial area assigned with the OK flag. Similarly, when there are a number N (N: integer) of partial areas each assigned with the OK flag, possible sets obtained by dividing those partial areas can be expressed as follows.

(Formula 11)

In the case of N being an even number,
assuming that the quotient of N/2 is F and K is an integer, there are a number F of sets given by a set of "F+F", a set of "(F+1) and (F−1)", ..., a set of "(F+K) and (F−K)" until reaching K=F−1.

(Formula 12)

In the case of N being an odd number,
assuming that the quotient of N/2 is F and K is an integer, there are a number (F−1) of sets given by a set of "(F+1)+F", a set of "(F+2) and (F−1)", ..., a set of "(F+K) and (F−K+1)" until reaching K=F−1.

When there are plural combinations in generating the OK rectangles not overlapping with the NO rectangle, the CPU 109 selects a combination of sets each including partial areas in number as close as possible to an equal number with priority. For example, the CPU 109 selects the combination of the OK rectangles each including two partial areas each assigned with the OK flag, as illustrated in FIG. 45, rather than the combination of the OK rectangle including three partial areas each assigned with the OK flag and the OK rectangle including one partial area assigned with the OK flag, as illustrated in FIG. 46. While the above description is made of the example in which the OK rectangle is divided into two rectangles, the trimming can also be performed by dividing the OK rectangle into three or more rectangles.

Figure 36:
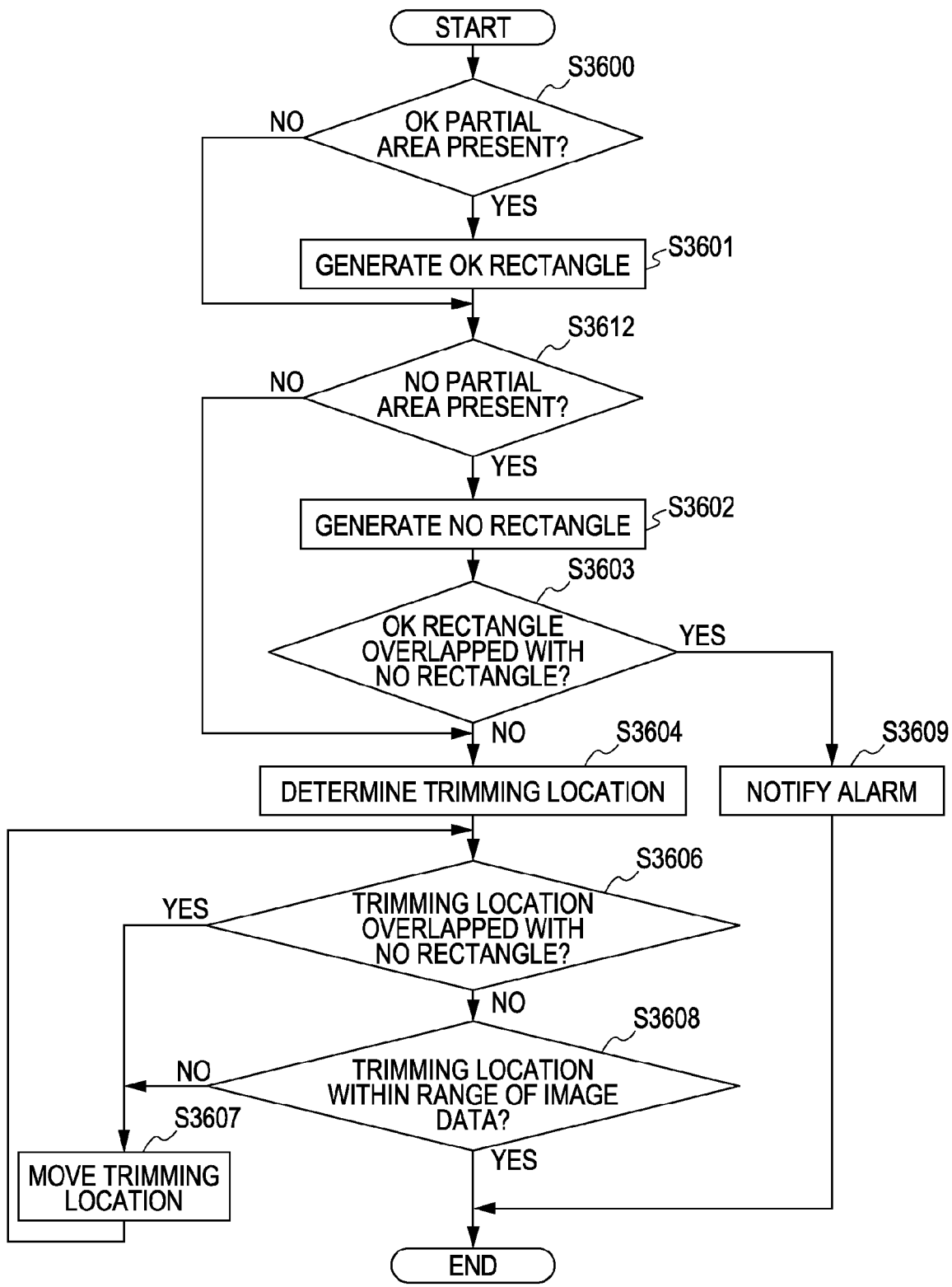
FIG. 36 is a flowchart illustrating examples of edit procedures for trimming in a fifth exemplary embodiment of the present invention.

After generating a plurality of OK rectangles as described above, the trimming location may be determined per group of divided partial areas (OK rectangles) by executing the same processing as that subsequent to step S3604 in FIG. 36 for each of the OK rectangles.

With the fifth exemplary embodiment, trimming of an image can be automatically performed with simple setting by the user in such a way that the trimming frame includes only an area predetermined by the user (e.g., one or more partial areas belonging to a predetermined group) or does not include a predetermined area.

While the first to fifth exemplary embodiments have been described above as realizing the concept of the present invention with the digital camera, a sixth exemplary embodiment will be described below in connection with the case of realizing the concept of the present invention with a computer apparatus.

Figure 47:
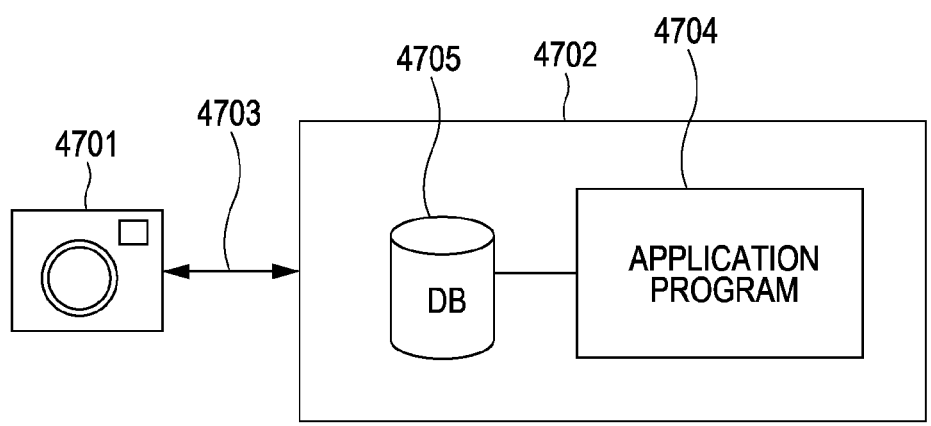
FIG. 47 is a block diagram illustrating an example of the overall configuration of an image processing system according to a sixth exemplary embodiment of the present invention.

FIG. 47 is a block diagram illustrating an example of the overall configuration of an image processing system according to the sixth exemplary embodiment. In FIG. 47, reference numeral 4701 denotes an image input apparatus capable of converting an optical image to an electrical signal and recording the electrical signal as digital information after executing predetermined image processing. The image input apparatus 4701 may be, for example, a digital still camera capable of taking a still image and recording the taken still image as image data. Other examples of the image input apparatus 4701 include a digital camera capable of taking a moving image and recording the taken image as moving image data, and a scanner capable of reading a document and outputting the contents of the document as image data. A driver for various storage media, which can read and output image data from the storage media storing the image data, can also be used instead of the apparatus capable of converting an optical image to an electrical signal and recording the electrical signal as image data. Reference numeral 4702 denotes an information processing apparatus comprising a personal computer (PC). The information processing apparatus is not limited to the personal computer and can also be a cell phone, a PDA, etc. A data transfer interface (I/F) 4703 transfers taken image data between the image input apparatus 4701 and the PC 4702. The data transfer I/F 4703 may comprise, for example, a wired interface represented by USB (Universal Serial Bus) or IEEE1394. A wireless interface, such as represented by IrDA or Bluetooth, can also be used as the data transfer I/F 4703. The present invention is not limited by the I/F type. Image data taken by the image input apparatus 4701 is transferred via the data transfer I/F 4703 to a storage area of a storage device that is represented by a hard disk drive (HDD) of the PC 4702. The transfer of the image data from the image input apparatus 4701 to the PC 4702 may be performed such that the image data stored in the storage device in the image input apparatus 4701 is transferred through batch processing in accordance with an instruction from the OS or dedicated software installed in the PC 4702. Alternatively, in accordance with a transfer command sent from the image input apparatus 4701, the image data can also be transferred to a data recording area prepared in an information recording device of the PC 4702 under control of the OS or dedicated software installed in the PC 4702. An image processing application program 4704 comprising computer-executable instructions may be installed in the storage device of the PC 4702 and is operable on the PC 4702. The PC 4702 starts up the image processing application program 4704 and is operated in accordance with the program 4704 so as to edit the image data stored in the storage device. A user data storage database (DB) 4705 includes various data used in processing executed by the image processing application program 4704 and is stored in the storage device. Another storage device, such as represented by the HDD of the PC 4702, can also be employed instead of the user data storage DB 4705.

Figure 48:
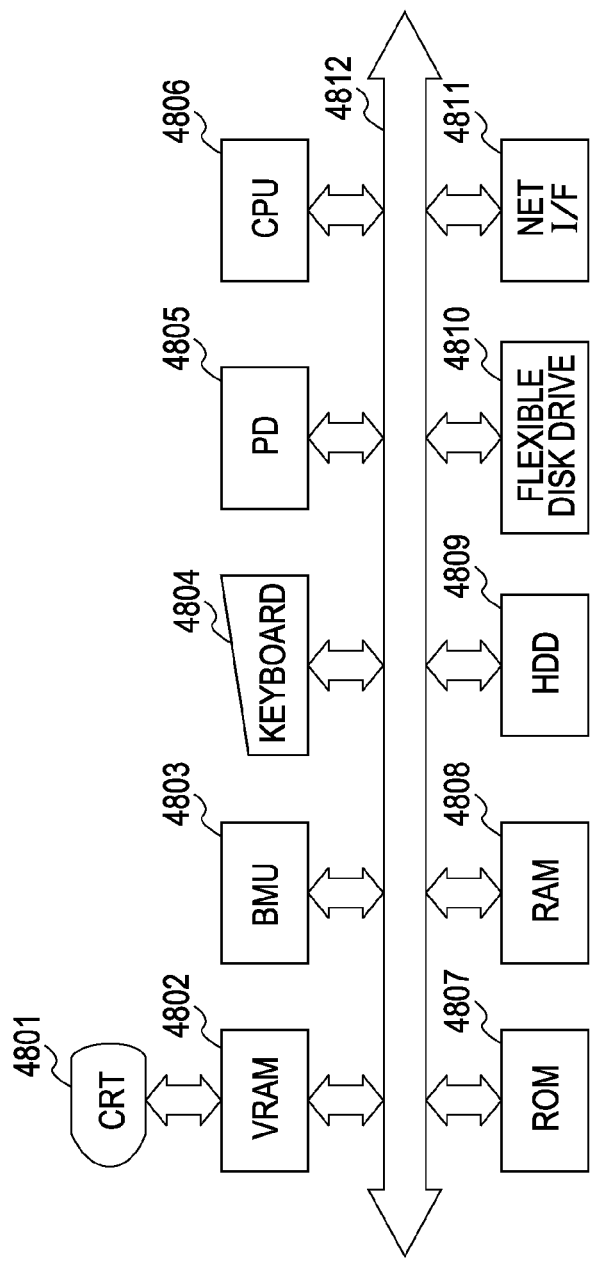
FIG. 48 is a block diagram illustrating an example of the overall configuration of an image processing apparatus according to the sixth exemplary embodiment of the present invention.

FIG. 48 is a block diagram illustrating an example of the overall configuration of the information processing apparatus in which the image processing application program 4704 having the computer-executable instructions is installed. As illustrated in FIG. 48, the information processing apparatus includes a VRAM (Video Random Access Memory) 4802, a BMU (Bit Move Unit) 4803, and a CPU (Central Processing Unit) 4806. Further, the information processing apparatus includes a ROM (Read Only memory) 4807 and a RAM (Random Access Memory) 4808. Still further, the information processing apparatus includes a display 4801, a keyboard 4804, and a PD (Pointing Device) 4805. In addition, the information processing apparatus includes a HDD (Hard Disk Drive) 4809, a FDD (Flexible Disk Drive) 4810, and a network I/F (Interface) 4811. The display 4801 displays, for example, not only edit information such as documents, figures and images under editing, but also icons, messages, menus, and other user interface (UI) information. An image to be displayed on the display 4801 is drawn on the VRAM 4802. Image data generated on the VRAM 4802 is transferred to the display 4801 in accordance with the predetermined standards, and an image is displayed on the display 4801. The BMU 4803 controls, for example, data transfer between memories (e.g., between the VRAM 4802 and another memory), and data transfer between a memory and each I/O device (e.g., the network I/F 4811). The keyboard 4804 includes various keys to input characters, documents, instructions, etc. The PD 4805 is used, for example, to enter an instruction with respect to icons, menus, and other contents displayed on the display 4801. The CPU 4806 controls various devices in accordance with control programs stored in the ROM 4807, the HDD 4809, or a flexible disk. The ROM 4807 stores various control programs and data. The RAM 4808 includes a work area for the CPU 4806, a data save area used in error processing, a load area for the control programs, etc. The HDD 4809 stores the various control programs and contents which are executed in the information processing apparatus. For example, the HDD 4809 stores the image data and the image processing application program. The FDD 4810 controls access to a flexible disk represented by Floppy (registered trade name) or the like. The network I/F 4811 is used for communication with an external apparatus, e.g., another information processing apparatus or a printer, via a network. A CPU bus 4812 includes an address bus, a data bus, and a control bus. The control program can be provided to the CPU 4806 from the ROM 4807, the HDD 4809 and the FDD 4810, or from another information processing apparatus, etc. through the network I/F 4811 via the network.

Manipulations made on the manipulating device 108 of the digital camera 100 in the above-described exemplary embodiments can correspond to those made on, through the keyboard 4804 or the PD 4805, UI information (such as including buttons and icons) which is displayed on the display 4801 by the PC 4702 in accordance with the image processing application program 4704. In other words, though in a different way from that in the case of the digital camera 100, the PC 4702 may realize a manipulating device, which can execute the same functions as those which are executable from the manipulating device 108 of the digital camera 100, with the image processing application program. The operations executed in the digital camera 100 under control of the CPU 109 in the above-described exemplary embodiments may be similarly executed by the CPU 4806 in this sixth exemplary embodiment, which can perform control on the PC 4702 in accordance with the image processing application program 4704. Further, the matters displayed on the display screen 201 of the digital camera 100 in the above-described exemplary embodiments may also similarly be displayed on the display 4801 of the PC 4702 in this sixth exemplary embodiment.

Various data stored in the storage memory 110 and the primary memory 105 of the digital camera 100 in the above-described exemplary embodiments may be similarly stored in, e.g., the VRAM 4802, the ROM 4807, the RAM 4808, and the HDD 4809 of the PC 4702 in this sixth exemplary embodiment. Those various data may be read and written, in accordance with the image processing application program 4704.

With this sixth exemplary embodiment, as described above, concepts according to the present invention can be implemented even in an information processing apparatus, for example, a personal computer, as in a digital camera. Accordingly, the user can perform the processing by optionally using one of those apparatuses, which may be more convenient to manipulate or with which is easier to view.

The concept of the present invention can also be implemented by executing processing as follows. A storage medium recording or storing program code to implement the functions according to the above-described exemplary embodiments may be supplied to a system or an apparatus. A computer (e.g., CPU or MPU) in the system or the apparatus reads the program code and/or computer-executable instructions stored in the storage medium.

In that case, the program code and/or computer-executable instructions read out from the storage medium, and the storage medium itself, may serve to implement functions according to the above-described exemplary embodiments. Therefore, the program code and the storage medium storing the program code may also serve to implement concepts according to the present invention.

Examples of the storage medium for supplying the program code and/or computer-executable instructions include at least one of a floppy disk, a hard disk, a magneto-optical disk, a CD-ROM, a CD-R, a CD-RW, a DVD-ROM, a DVD-RAM, a DVD-RW, a DVD+RW, a magnetic tape, a nonvolatile memory card, and a ROM. The program code and/or computer-executable instructions can also be downloaded via a network.

Further, aspects of the present invention can involve a case where the functions according to the above-described exemplary embodiments are implemented by the computer executing the read-out program code and/or computer-executable instructions. In addition, the present invention can involve a case where an OS (operating system) or the like running on the computer executes a part or the whole of actual processing in accordance with instructions from the program code and/or computer-executable instructions and the functions of the above-described exemplary embodiments may be implemented by the processing executed by the OS or the like.

In addition, aspects of the present invention can involve a case where the functions according to the above-described exemplary embodiments may be implemented as follows. The program code and/or computer-executable instructions read out from the storage medium are written in a memory which is provided in a function extension board inserted in the computer or in a function extension unit connected to the computer. Thereafter, a part or the whole of the actual processing may be executed by a CPU or the like, which is incorporated in the function extension board or the function extension unit, in accordance with instructions from the program code and/or computer-executable instructions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-130760 filed May 19, 2008, No. 2008-113898 filed Apr. 24, 2008, No. 2008-113899 filed Apr. 24, 2008, and No. 2008-130761 filed May 19, 2008, which are hereby incorporated by reference herein in their entirety.

What is claimed is:

1. An image taking apparatus operable to obtain image data by taking an image of an object, to record the image data on a recording medium, and to reproduce the image data recorded on the recording medium to display the image, the image taking apparatus comprising:
a display unit that displays an image on an entire predetermined display area;
a scale-up display unit that enlarges and displays a partial area of the image, on the entire predetermined display area, in response to a user's manipulation;
an obtaining unit that obtains position information indicating a position of the partial area in the image after the scale-up display unit enlarges and displays the partial area of the image;
a setting unit that selectively sets a rating for the partial area of the image, while the scale-up display unit enlarges and displays the partial area of the image; and
a storing unit that stores, on the recording medium, the rating set for the partial area of the image and the obtained position information, in relation to the image data,
wherein the rating is related to content of the partial area of the image displayed by the scale-up display unit,
wherein the display unit displays the image together with information representing the rating set for the partial area,
wherein the image taking apparatus comprises a processor executing a program stored in a memory to implement at least a part of a function of at least one of the units, and
wherein the rating indicated whether the partial area of the image is a success in image-taking or a failure in the image-taking.

2. The image taking apparatus according to claim 1, further comprising:
a search unit that searches for the image data from the recording medium based on the rating stored in relation to the image data.

3. The image taking apparatus according to claim 1, wherein the display unit displays the partial area in a manner separately recognizable from other areas and displays the partial area together with mark information representing the rating set for the partial area.

4. The image taking apparatus according to claim 1, wherein the partial area of the image, for which the rating indicates a predetermined value, is set as a target of at least one of displaying as a slide show, storing a predetermined folder, attaching to email, writing to a recording medium, sending to an external information processing apparatus or camera, printing, arranging on an electronic photo album, and deleting.

5. The image taking apparatus according to claim 1, wherein the scale-up display unit enlarges and displays the partial area of the image in response to the user's manipulation of a manipulating device which is used to input an instruction for adjustment of enlargement or reduction of an object to be photographed.

6. The image taking apparatus according to claim 1, wherein said setting unit sets a rating for the partial area of the image in response to a predetermined user's manipulation.

7. The image taking apparatus according to claim 1 further comprising:
a recognition unit that executes recognition process for the partial area of the image,
wherein said setting unit sets a rating for the partial area of the image based on the result of the recognition.

8. The image taking apparatus according to claim 1, wherein said scale-up display unit displays a plurality of partial areas of the image one by one in the enlarged scale.

9. The image taking apparatus according to claim 1 further comprising:
a guide display unit that displays a corresponding position of the partial area in the entire area of the image,
wherein the partial area of the image in the enlarged scale and the corresponding position of the partial area are simultaneously displayed.

10. A management method adapted to manage image data obtained by taking an image of an object, the management method comprising the steps of:
displaying an image on an entire predetermined display area;
enlarging and displaying a partial area of the image on the entire predetermined display area, in response to a user's manipulation;
obtaining position information indicating a position of the partial area in the image after the partial area of the image is enlarged and displayed;
selectively setting a rating for the partial area of the image, while the partial area of the image is enlarged and displayed;
storing, in relation to the image data, the rating set for the partial area of the image and the obtained position information, in a recording medium; and
displaying the image together with information representing the rating set for the partial area,
wherein the rating is related to content of the partial area of the image that is enlarged and displayed,
wherein a processor executes a program stored in a memory to implement at least a part of a function of at least one of the steps,
wherein the rating indicates whether the partial area of the image is a success in image-taking or a failure in image-taking.

11. A non-transitory computer-readable storage medium storing computer-executable instructions which cause an apparatus to execute a management method adapted to manage image data obtained by taking an image of an object, the computer-readable storage medium comprising:
computer-executable instructions for displaying an image on an entire predetermined display area;
computer-executable instructions for enlarging and displaying a partial area of the image on the entire predetermined display area, in response to a user's manipulation;
computer-executable instructions for obtaining position information indicating a position of the partial area in the image after the partial area of the image is enlarged and displayed;
computer-executable instructions for selectively setting a rating for the partial area of the image, while the partial area of the image is enlarged and displayed;
computer-executable instructions for storing, in relation to the image data, the rating set for the partial area of the image and the obtained position information, in a recording medium; and computer-executable instructions for displaying the image together with information representing the rating set for each of the partial areas,
wherein the rating is related to content of the partial area of the image that is enlarged and displayed, and
wherein the rating indicates whether the partial area of the image is a success in image-taking or a failure in image-taking.

12. An image taking apparatus operable to obtain image data by taking an image of an object, to record the image data on a recording medium, and to reproduce the image data recorded on the recording medium to display the image, the image taking apparatus comprising:
a display unit that displays an image on an entire predetermined display area;
a scale-up display unit that enlarges and displays a partial area of the image, on the entire predetermined display area, in response to a user's manipulation;
an obtaining unit that obtains position information indicating a position of the partial area in the image after the scale-up display unit enlarges and displays the partial area of the image;
a setting unit that selectively sets a rating for the partial area of the image, while the scale-up display unit enlarges and displays the partial area of the image; and
a storing unit that stores, on the recording medium, the rating set for the partial area of the image and the obtained position information, in relation to the image data,
wherein the rating is related to content of the partial area of the image displayed by the scale-up display unit,
wherein the image taking apparatus comprises a processor executing a program stored in a memory to implement at least a part of a function of at least one of the units, and
wherein the rating indicates whether the partial area of the image is a success in image-taking or a failure in image-taking.

13. The image taking apparatus according to claim 12, further comprising:
a search unit that searches for the image data from the recording medium based on the rating stored in relation to the image data.

14. The image taking apparatus according to claim 12, wherein the display unit displays the partial area in a manner separately recognizable from other areas and displays the partial area together with mark information representing the rating set for the partial area.

15. The image taking apparatus according to claim 12, wherein the partial area of the image, for which the rating indicates a predetermined value, is set as a target of at least one of displaying as a slide show, storing a predetermined folder, attaching to email, writing to a recording medium, sending to an external information processing apparatus or camera, printing, arranging on an electronic photo album, and deleting.

16. The image taking apparatus according to claim 12, wherein the rating indicates whether the partial area of the image is a success in image-taking or a failure in image-taking.

17. An image processing apparatus operable to obtain image data and to display the image, the image processing apparatus comprising:
a display unit that displays an image on an entire predetermined display area;
a scale-up display unit that enlarges and displays a partial area of the image, on the entire predetermined display area, in response to a user's manipulation;
an obtaining unit that obtains position information indicating a position of the partial area in the image after the scale-up display unit enlarges and displays the partial area of the image;
a selecting unit that selects one of a plurality of predetermined tags for the partial area of the image, while the scale-up display unit enlarges and displays the partial area of the image; and
a storing unit that stores, on the recording medium, the selected tag for the partial area of the image and the obtained position information, in relation to the image data,
wherein the tag is related to content of the partial area of the image displayed by the scale-up display unit,
wherein the image processing apparatus comprises a processor executing a program stored in a memory to implement at least a part of a function of at least one of the units, and
wherein the tag indicates whether the partial area of the image is a success in image-taking or a failure in image-taking.

18. The image taking apparatus according to claim 17, further comprising:
a search unit that searches for the image data from the recording medium based on the rating stored in relation to the image data.

19. The image taking apparatus according to claim 17, wherein the display unit displays the partial area in a manner separately recognizable from other areas and displays the partial area together with mark information representing the rating set for the partial area.

20. The image taking apparatus according to claim 17, wherein the partial area of the image, for which the rating indicates a predetermined value, is set as a target of at least one of displaying as a slide show, storing a predetermined folder, attaching to email, writing to a recording medium, sending to an external information processing apparatus or camera, printing, arranging on an electronic photo album, and deleting.

21. The image taking apparatus according to claim 17, wherein the rating indicates whether the partial area of the image is a success in image-taking or a failure in image-taking.

22. An image taking method to obtain image data by taking an image of an object, to record the image data on a recording medium, and to reproduce the image data recorded on the recording medium to display the image, the image taking method comprising:
displaying an image on an entire predetermined display area;
enlarging and displaying a partial area of the image, on the entire predetermined display area, in response to a user's manipulation;
obtaining position information indicating a position of the partial area in the image after enlarging and displaying the partial area of the image;
selectively setting a rating for the partial area of the image, while enlarging and displaying the partial area of the image; and
storing, on the recording medium, the rating set for the partial area of the image and the obtained position information, in relation to the image data,
wherein the rating is related to content of the partial area of the displayed image, and
wherein the rating indicates whether the partial area of the image is a success in image-taking or a failure in image-taking.

23. An image processing method to obtain image data and to display the image, the image processing method comprising:
- displaying an image on an entire predetermined display area;
- enlarging and displaying a partial area of the image, on the entire predetermined display area, in response to a user's manipulation;
- obtaining position information indicating a position of the partial area in the image after enlarging and displaying the partial area of the image;
- selecting one of a plurality of predetermined tags for the partial area of the image, while enlarging and displaying the partial area of the image; and
- storing, on the recording medium, the selected tag for the partial area of the image and the obtained position information, in relation to the image data,
- wherein the tag is related to content of the partial area of the displayed image displayed by the scale-up display unit, and
- wherein the tag indicates whether the partial area of the image is a success in image-taking or a failure in image-taking.

24. A non-transitory computer readable medium having program code stored thereon to cause an image taking apparatus to perform an image taking method to obtain image data by taking an image of an object, recording the image data on a recording medium, and reproducing the image data recorded on the recording medium to display the image, the image taking method comprising:
- displaying an image on an entire predetermined display area;
- enlarging and displaying a partial area of the image, on the entire predetermined display area, in response to a user's manipulation;
- obtaining position information indicating a position of the partial area in the image after enlarging and displaying the partial area of the image;
- selectively setting a rating for the partial area of the image, while enlarging and displaying the partial area of the image; and
- storing, on the recording medium, the rating set for the partial area of the image and the obtained position information, in relation to the image data,
- wherein the rating is related to content of the partial area of the displayed image, and
- wherein the rating indicates whether the partial area of the image is a success in image-taking or a failure in image-taking.

25. A non-transitory computer readable medium having program code stored thereon to cause an image processing apparatus to perform an image processing method to obtain image data and to display the image, the image processing method comprising:
- displaying an image on an entire predetermined display area;
- enlarging and displaying a partial area of the image, on the entire predetermined display area, in response to a user's manipulation;
- obtaining position information indicating a position of the partial area in the image after enlarging and displaying the partial area of the image;
- selecting one of a plurality of predetermined tags for the partial area of the image, while enlarging and displaying the partial area of the image; and
- storing, on the recording medium, the selected tag for the partial area of the image and the obtained position information, in relation to the image data,
- wherein the tag is related to content of the partial area of the displayed image displayed by the scale-up display unit, and
- wherein the tag indicates whether the partial area of the image is a success in image-taking or a failure in image-taking.

* * * * *